United States Patent [19]

Hennington

[11] Patent Number: 4,821,242
[45] Date of Patent: Apr. 11, 1989

[54] DEPOSITIONAL RECONSTRUCTION FOR PETROLEUM LOCATION

[76] Inventor: Willard M. Hennington, 507 Patchester, Houston, Tex. 77079

[21] Appl. No.: 103,716

[22] Filed: Oct. 2, 1987

Related U.S. Application Data

[63] Continuation-in-part of Ser. No. 878,628, Jun. 26, 1986, abandoned.

[51] Int. Cl.[4] ............................................. G01V 1/00
[52] U.S. Cl. ....................................... 367/53; 367/73; 364/421
[58] Field of Search .................. 364/421, 422; 367/13, 367/14, 36, 37, 38, 39, 40, 41, 42, 50, 53, 54, 59, 73

[56] References Cited

U.S. PATENT DOCUMENTS

| | | | |
|---|---|---|---|
| 4,458,205 | 7/1984 | Kings | 324/345 |
| 4,558,437 | 12/1985 | Meeder et al. | 367/15 |
| 4,577,297 | 3/1986 | Kalkomey et al. | 367/15 |
| 4,611,312 | 9/1986 | Ineda | 367/53 |

Primary Examiner—Brian S. Steinberger

[57] ABSTRACT

Depositional reconstruction for petroleum location is a new exploration-development technique for delineating hydrocarbon accumulations and prospect development. The technique uses existing information and establishes a relationship between present day subsurface structure and stratigraphic prehistoric reservoir development for determination and projection of relative reservoir development, definition and grading of combination structural-stratigraphic type traps, determination of permeability barriers, migration paths, accumulation areas, prospect grading, pressure cells and prediction of fluid movement. Depositional reconstruction results in a summary map which outlines productive areas, shows potential extensions, graded prospects, relative reservoir developments, and the other stratigraphic conditions which control the successful economic exploitation of a potential horizon.

5 Claims, 21 Drawing Sheets

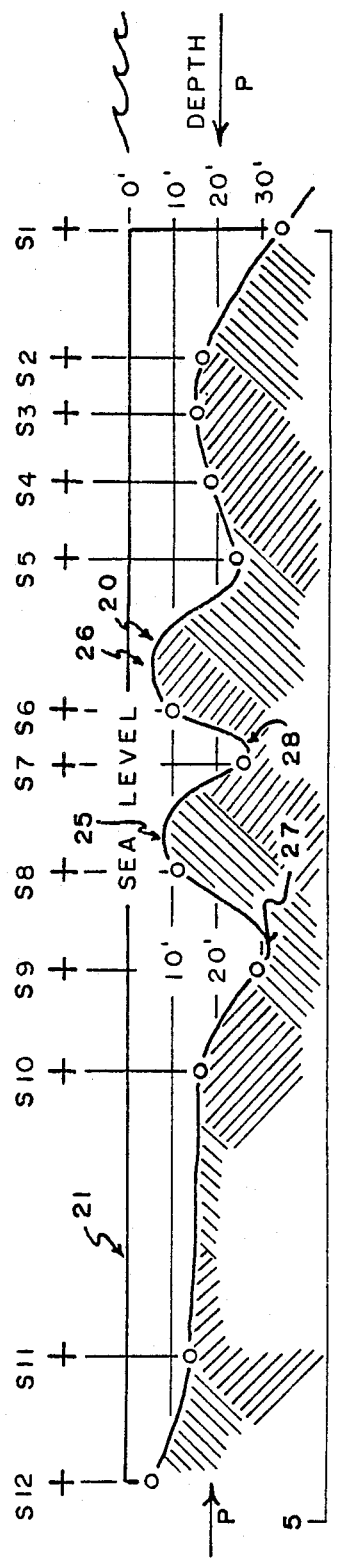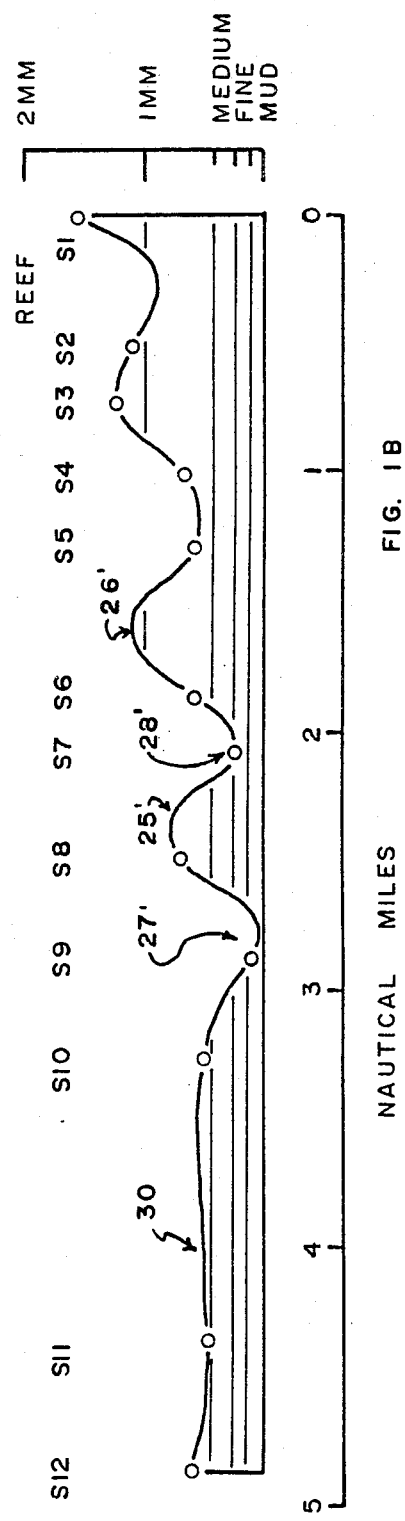
FIG. 1A
FIG. 1B
FIGURE 1

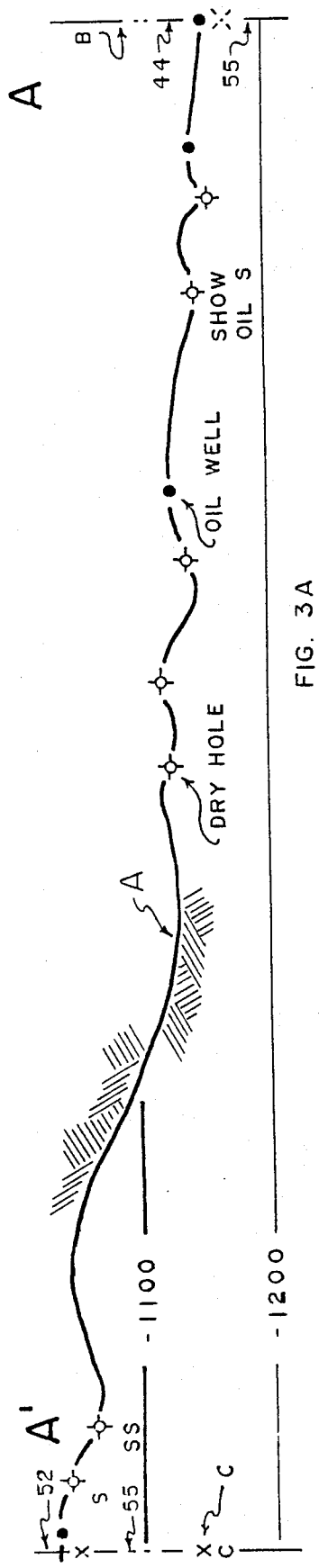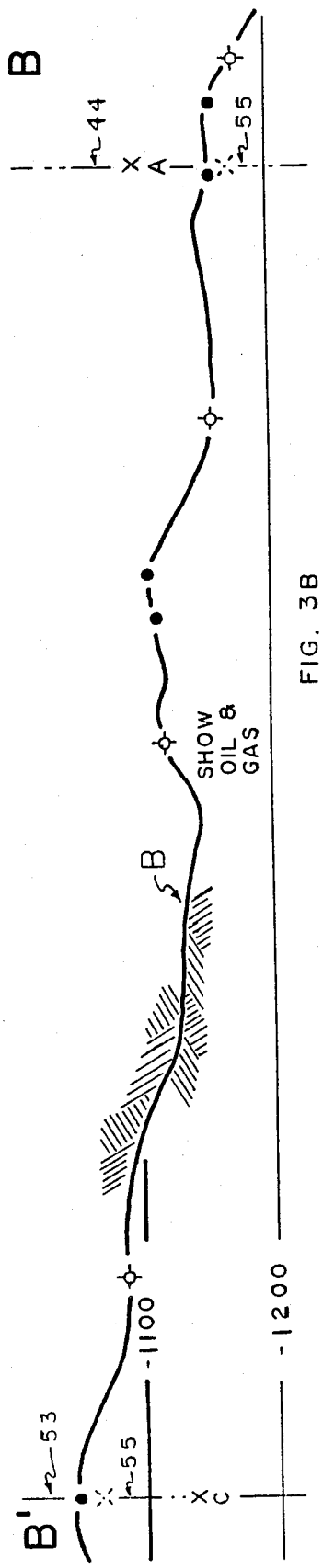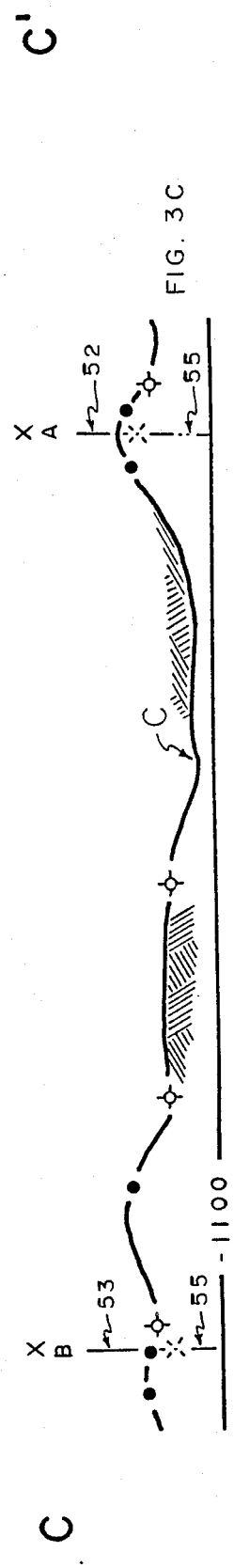
FIG. 3A
FIG. 3B
FIG. 3C
FIGURE 3

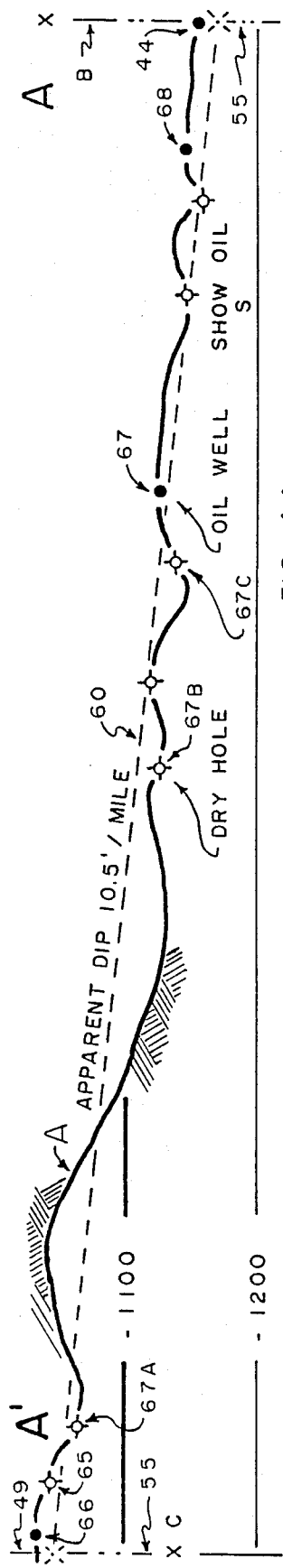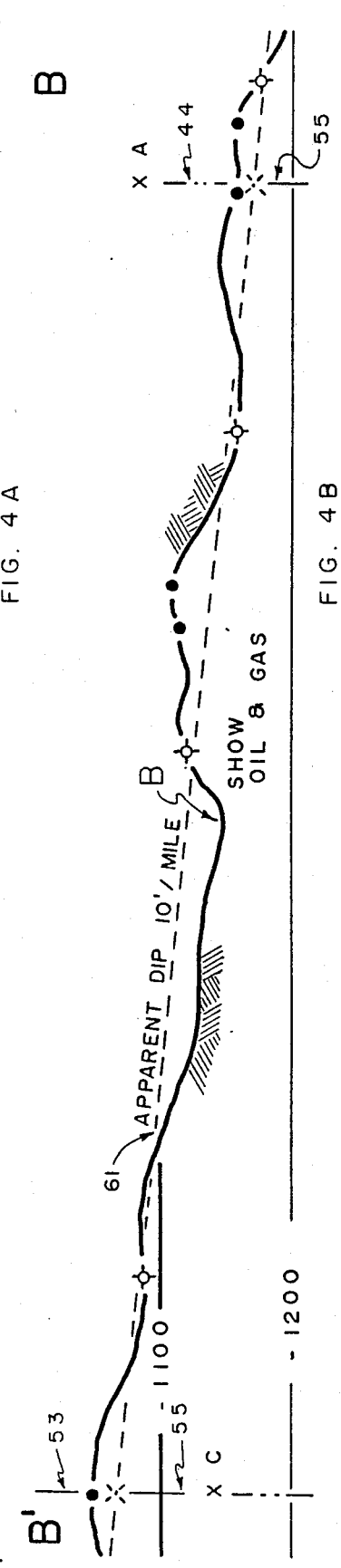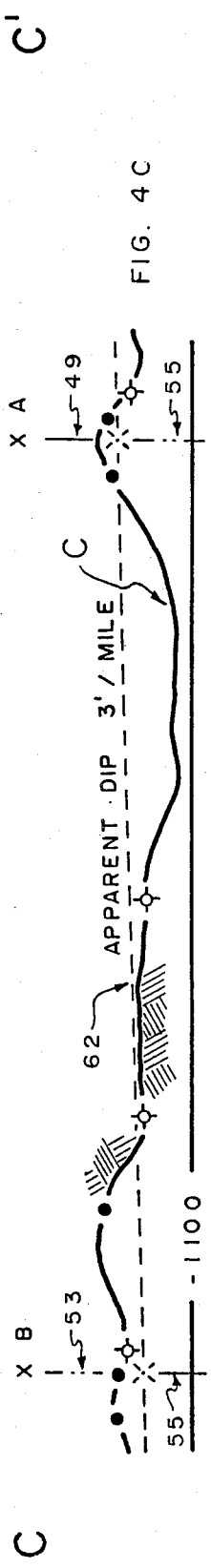
FIG. 4A
FIG. 4B
FIG. 4C
FIGURE 4

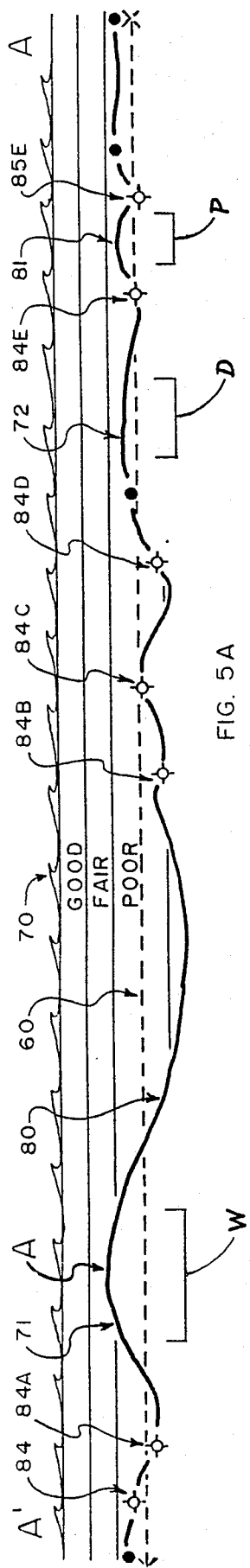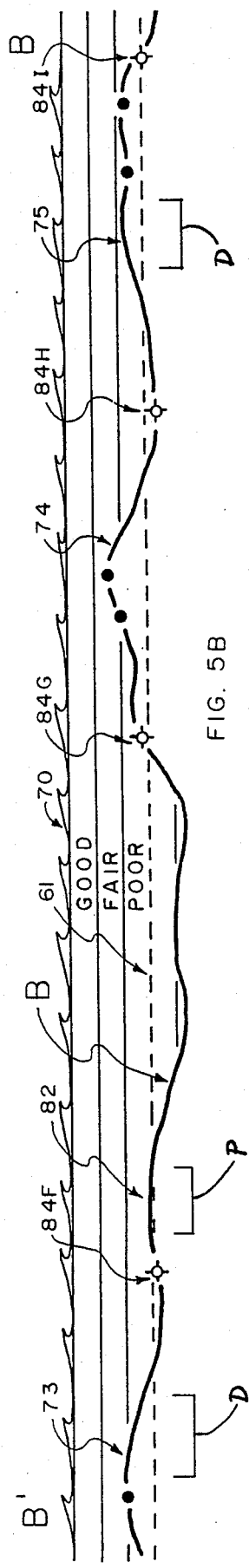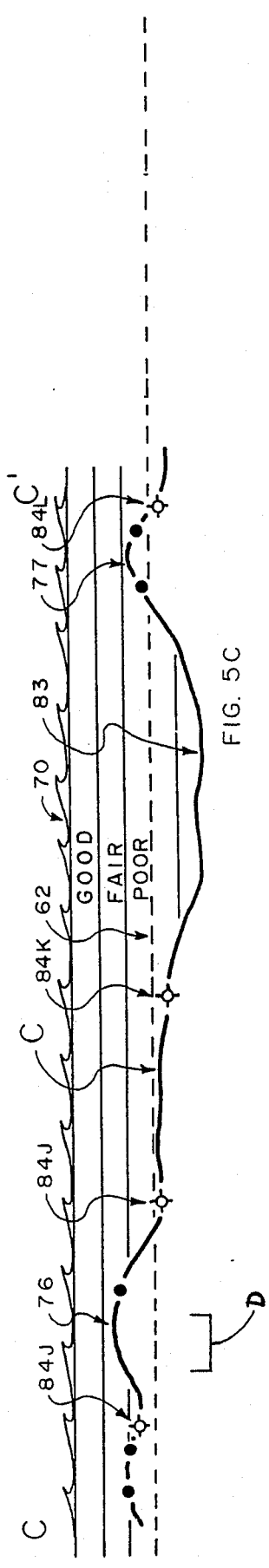
FIGURE 5

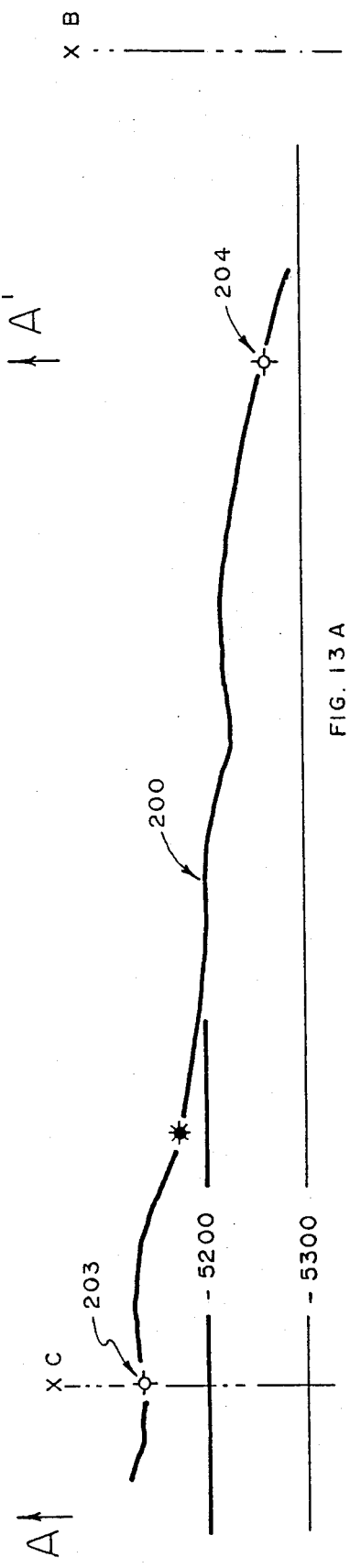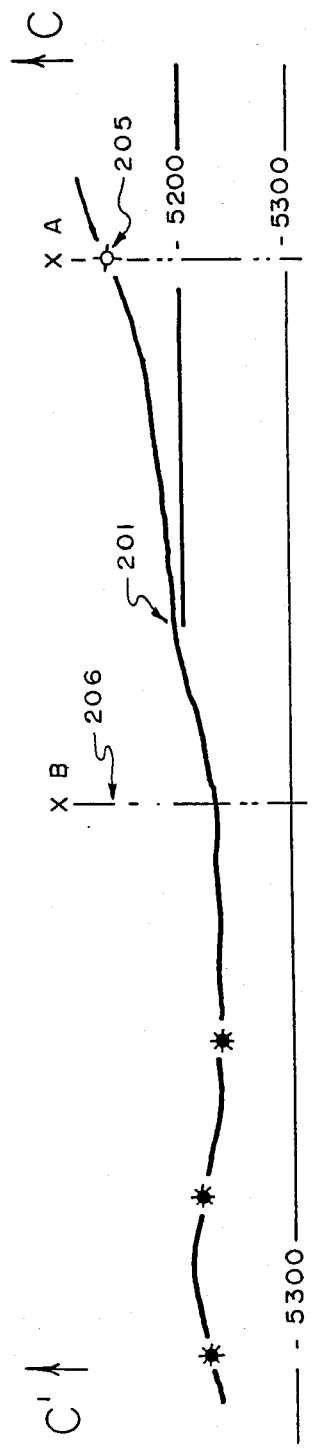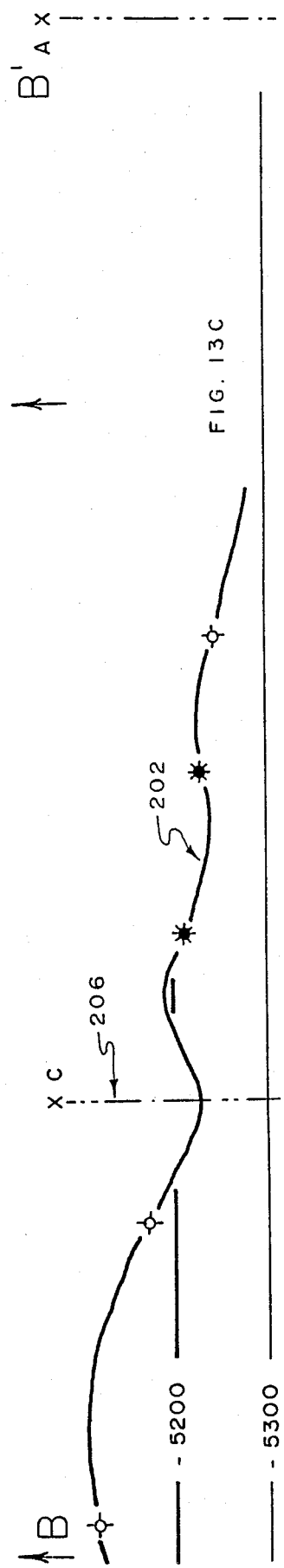
FIG. 13A
FIG. 13B
FIG. 13C
FIGURE 13

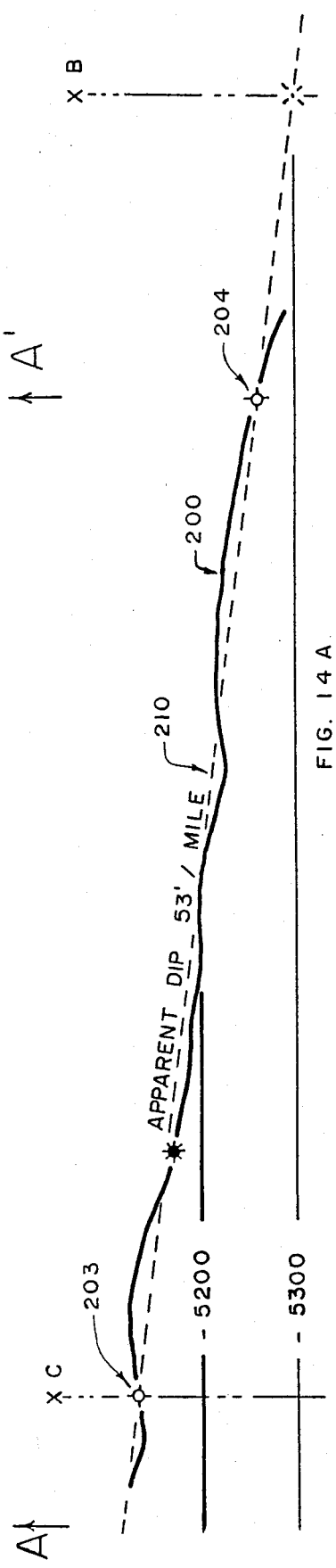
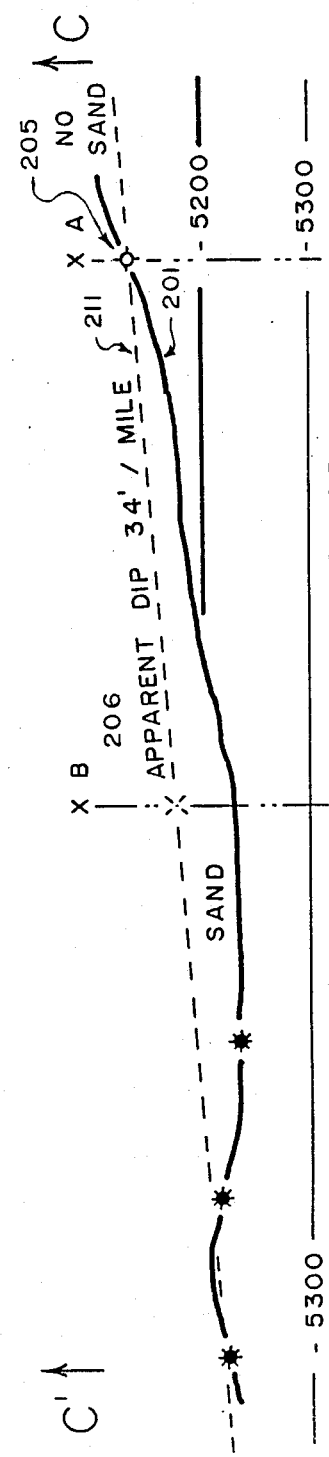
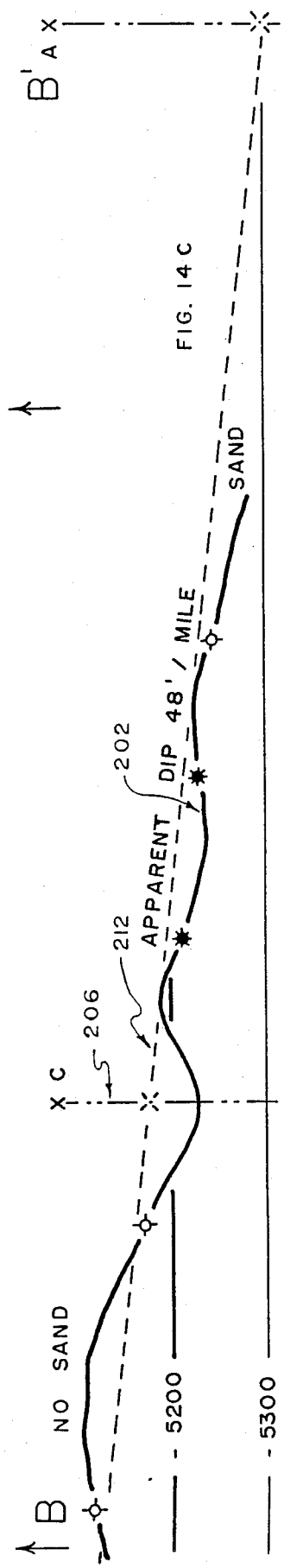
FIGURE 14

4,821,242

DEPOSITIONAL RECONSTRUCTION FOR PETROLEUM LOCATION

PRIOR APPLICATION

This is a continuation-in-part of co-pending application Ser. No. 878,628 filed on June 26, 1986, now abandoned and entitled "DEPOSITIONAL RECONSTRUCTION FOR PETROLEUM LOCATION" and the benefits under 35 USC § 120 are claimed.

FIELD OF THE INVENTION

The present invention relates to exploration for hydrocarbons and more particularly to a process for reconfiguring data of a subsurface stratum to approximate its prehistoric stratum for the purpose of determining likely reservoir prospects.

BACKGROUND

Seismic exploration is practiced by utilizing data to determine location of subsurface strata. After wells are drilled in an area, logs of the earth formations can be used to locate and correlate the depth of various similar strata with respect to the wells. The logs also provide porosity data as well as production data. However, there are many unknowns and analysis of well data may not correlate in predicting reservoir production. For example, the same strata may be non-productive at one location and productive at another location. This can be due to a number of factors including depletion of the hydrocarbons by migration between different levels, faults which interrupt continuity of strata and a host of other reasons. By means of the present invention the predictability of reservoir production from a stratum is greatly enhanced.

SUMMARY OF THE PRESENT INVENTION

Depositional Reconstruction is a new process for locating hydrocarbons by establishing a relationship between present day subsurface structure and prehistoric depositional surfaces. A stratigraphic subsurface reservoir development of prehistoric depositional surfaces allows projection and evaluation of existing stratigraphic subsurface reservoir conditions. The process allows: definition of the stratigraphic element of combination structural-stratigraphic type traps or boundaries for subsurface prospect and field limits; determination of permeability barriers in subsurface strata; determination of migration paths in subsurface strata; accumulation areas in subsurface strata; and relative reservoir quality and prospect grading of subsurface strata. The process can also be applied to the location and definition of formation subcrop areas for definition of hydrocarbon accumulations.

Depositional Reconstruction according to the process of the present invention allows determination of the critical structure needed for desired reservoir quality and definition of productive limits of hydrocarbons in a subsurface formation. This critical structure can then be accurately confirmed with a minimum of seismic control or operations.

The theory underlying the present invention assumes that deposition of particulate matter which was the origin of present day hydrocarbons took place on an uneven sea floor with conditions similar to present day submarine topography and conditions. In a sea, the wave energy decreases as a function of depth along with a decreased ability to transport, sift and sort sediments or particulate matter. In most cases, the cleanest and coarsest sediments are deposited on the submarine highs (underwater locations closer to the surface of the water) with the muddy fines in the submarine lows (underwater locations deeper with respect to "highs" and to the surface of the water). Present day primary reservoir developments are correlatable relative to the original depositional structure of a prehistoric era.

Depositional reconstruction is a new process which can determine from existing well control or well data, an adjustment factor needed to adjust present day subsurface structure to approximate the original depositional structure existing at the time of deposition on an underwater sea floor. The original depositional structure is a primary controlling factor in original sediment distribution, sorting, winnowing, organic growth, preservation of present day hydrocarbon source material, and primary accumulation.

The depositional structure is obtained by using the most accurate topographical profile structure of the present subsurface reservoir being evaluated, drawing a series of controlled straight lines for defining intersecting vertical structural profiles with respect to the horizontal, establishing the apparent dip of an adjustment plane for each profile, determining the true dip and strike of an adjustment plane from the apparent dips of any two intersecting profiles; determining adjustment for converting the present day reservoir structure to a prehistoric depositional structure for stratigraphic evaluation and prospect summary.

The depositional reconstruction process has application in prospect generation, field limit definition, reservoir evaluation, secondary recovery, storage fields, regional exploration for hydrocarbons, and a better understanding of the complex geochemistry involved in detecting and mapping of potential hydrocarbon forming source beds. The depositional reconstruction process is both economical and quick and utilizes existing information or well data.

BRIEF DESCRIPTION OF THE DRAWINGS

FIG. 1A is a view in vertical cross-section of a present day sea floor;

FIG. 1B is a profile or textural representation of deposits as a function of the grain size along a sea floor and is correlated to FIG. 1A;

FIGS. 3(A–C) are respectively vertical cross-section views (present day structural profiles) taken along the control lines A—A', B—B' and C—C' of FIG. 2;

FIGS. 4(A–C) are respectively present day structural profile views similar to FIGS. 3(A–C) and showing apparent dip lines of the depositional plane for each profile;

FIGS. 5(A–C) are respectively depositional structural profile views similar to FIGS. 4(A–C) and showing the apparent dip lines and profile appearance when translated or rotated to a horizontal plane;

FIGS. 13(A-C) are respectively vertical cross-section views (structural profiles) taken along the control line A—A', B—B' and C—C' of FIG. 12;

FIGS. 14(A-C) are respectively views similar to FIGS. 13(A-C) and showing apparent dip lines of the depositional plane for a cut and fill or channel sand reservoir;

DESCRIPTION OF THE PRESENT INVENTION

Figure 2:
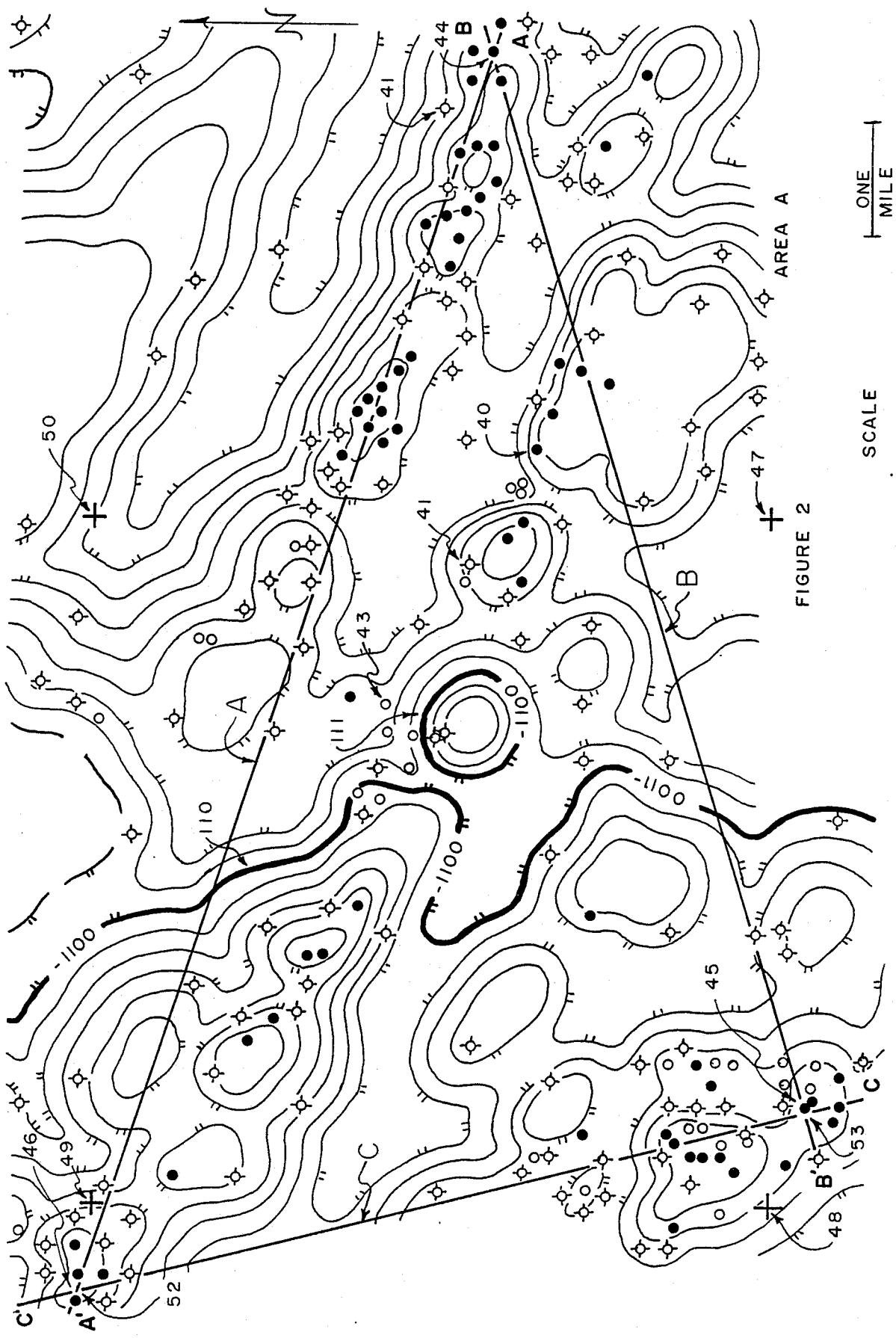
FIG. 2 is a sub-surface structural contour map of a present day study area and illustrates test well locations, well types, township markers, and profiles A, B and C.

The present invention is based upon certain premises which assume that in prehistoric eras (geologic past) a sediment deposition occurred on an uneven sea floor configured much like the present submarine sea floor topography; that a reference depositional plane with respect to the sea floor was generally horizontal; that the texture of sediment deposition was related to the sea floor topography so that there was a generally horizontal depositional plane with respect to the depositional sea level; and that in the evolution to the present day position of the old sediments and prehistoric sea floor, there has been an angular displacement of the depositional plane of the original prehistoric sea floor with respect to the original horizontal depositional sea level plane which was caused by movement of the earth strata. In the present invention, present day subsurface data is utilized to establish the depositional relationship and to reconstruct a reference topographical and horizontal depositional surface of a prehistoric era (which controlled sediment deposition) for enhancing the prospects of locating favorable reservoir conditions for combination-structural-stratigraphic type hydrocarbon accumulations and for determining accumulation areas, permeability barriers and migration paths.

GENERAL OVERVIEW

The present invention is based upon an underlying depositional theory that assumes that sediment deposition in a prehistoric era occurred upon an uneven sea floor configured much like the present submarine topography. FIG. 1A in summary, illustrates that wave turbulance decreases with depth along with the wave's energy and ability to move sediment; that the depositional highs (FIG. 1B) are where the coarsest and cleanest clastic sediments would be deposited and where organic carbonates would tend to grow; and that any channel or cut-and-fill deposits would be on the flanks and in the depositional lows.

The depositional highs are also the areas where erosion would be expected to occur, resulting in the preservation of potential hydrocarbon reservoirs in the depositional lows. The axes of depositional highs become the migration paths for secondary hydrocarbons. The depositional lows are where the fine sediments and muds settle out and are deposited. The depositional lows become areas of decreased primary porosity and ultimately become permeability barriers. The depositional flanks and lows are also the preservation area for preserved organic material which becomes the potential hydrocarbon source material. The areas bounded by the permeability barriers become the primary hydrocarbon source areas from which accumulation occurs.

Using this theory, the prehistoric depositional structure can be determined by establishing the relationship between present day subsurface structure and the reservoir conditions in existing wells. The establishment of the relationship results in adjustment factors for the specific reservoir or subsurface structure that can be applied to the present day structure to result in an approximation of the prehistoric depositional structure (See FIG. 9). Primary reservoir quality is relative to depositional structure and can be projected by structural control utilizing the established relationship (See FIGS. 10 and 11).

Primary reservoir development is related to the prehistoric depositional structure so that the higher the elevation of the prehistoric depositional structure, the better the primary reservoir development would be unless the structure is too high and has submarine erosion. Reservoir quality can be estimated and graded along with the determination of the base of effective porosity development.

Figure 11:
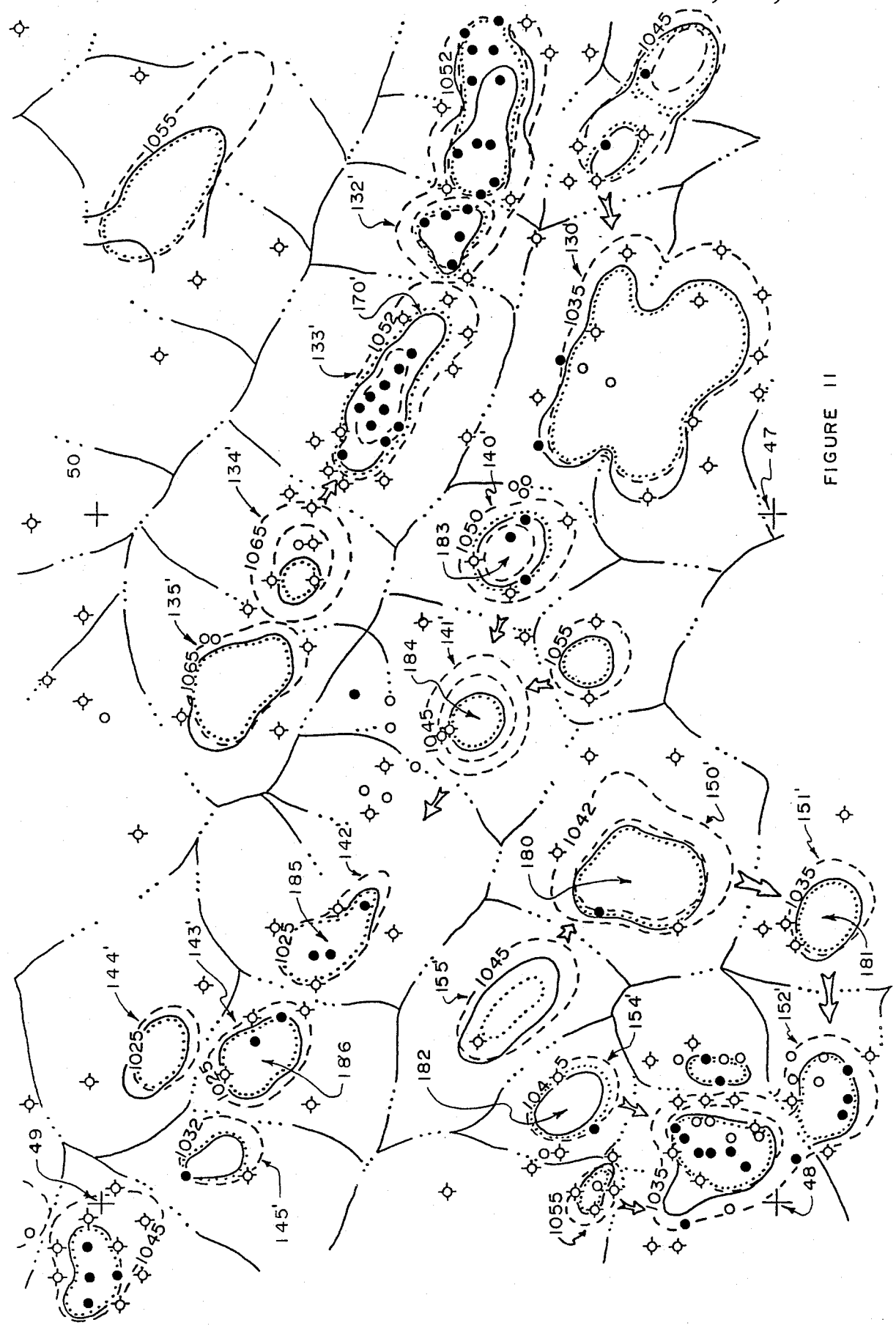
FIG. 11 is a prospect summary map constructed from the interpretation plot of FIG. 10, and the structural data from FIG. 2 where primary accumulation and production areas are indicated by dotted lines.

Combination structural-stratigraphic traps can then be accurately outlined by combining the up dip reservoir development limits with the down dip structural limit (See FIG. 11). Potential development locations and new prospects can be further evaluated for drilling.

Figure 10:
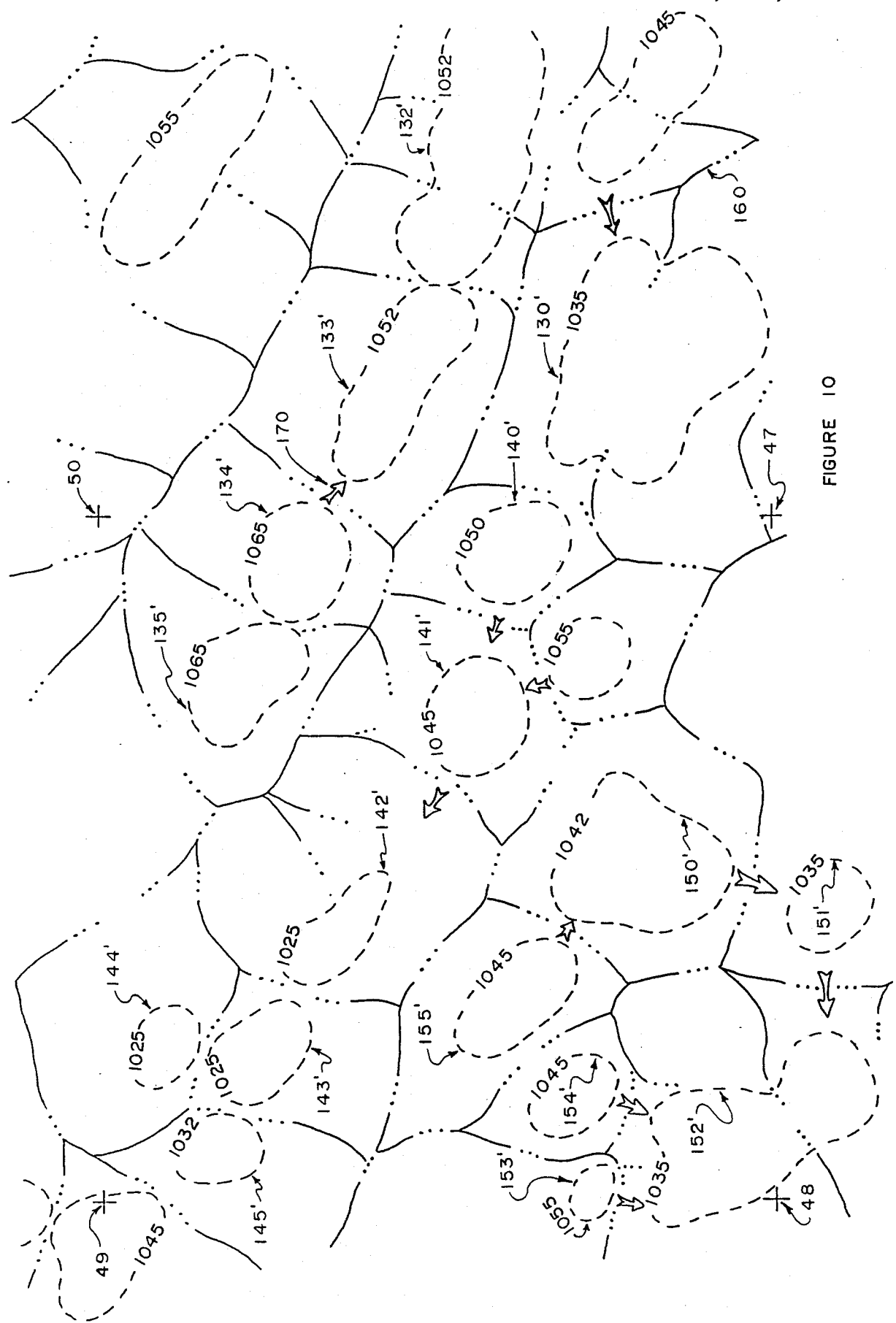
FIG. 10 is a depositional interpretation plot constructed from the depositional structural map of FIG. 9.

Hydrocarbons primarily migrate from the source beds on the depositional flanks and in the lows to closed depositional structures (See FIG. 10). If a reservoir becomes filled with fluids, the fluids will spill over at the highest depositional structural point and then migrate along the axis or path of the depositional high to the next depositional structural closure. With the ability to evaluate these conditions, initial accumulations of fluids, spill points and migration paths of fluids are determinable, along with known areas of hydrocarbon saturated reservoirs and water wet reservoirs.

As the prehistoric structure was tilted to its present day structural position, the accumulated hydrocarbons had a tendency to make a secondary adjustment. The secondary adjustment that occurs depends upon the quality of reservoir, which can be determined from the prehistoric depositional structure, along with the fact that the hydrocarbons take the path of least resistance and primarily move into the better quality reservoirs with limited movement into poorer quality reservoirs. The secondary adjustment allows hydrocarbons to move up dip into previously water wet reservoirs while a down dip, previously hydrocarbon wet reservoir, is invaded and flushed with water. This type of information could influence hydrocarbon saturation calculations of a reservoir analyst.

Compaction fracture reservoirs can be predicted and projected by using the depositional structure technique. Cleaner sands are deposited on the crest of the depositional highs with muds and thin sands deposited on the flanks of the depositional highs. When the sediments compact, there is differential compaction between the clean sands which have little compaction and the muds on the flanks that have considerable compaction. This condition results in differential compaction fractures on the flanks of depositional highs which substantially increases permeability in the reservoir. Compaction fractures appear to be randomly dispersed on present day structure but have a distinct pattern associated with prehistoric depositional structure.

Subcrop of a potentially productive horizon or structure at an unconformity can be determined by using the same depositional reconstruction technique. First a structure map is made on top of the unconformity. Straight line, intersecting profiles are made from the structure on top of the unconformity and the apparent dip of the horizon determined. The true dip and strike are calculated, the adjustment plane constructed, and the depositional structure data calculated. The horizon of interest occurs as a band parallel to the depositional contours. When this band is placed on the unconformity structure map, the combination structural-stratigraphic trap can be summarized for further evaluation and prospect definition.

Complex areas or large areas may require more than one plane. The individual planes are set up in the areas with control and then related and joined for depositional reconstruction.

Since a relationship between reservoir quality and present day structure can be established by using this new process, it becomes possible to project reservoir development with structure. Critical structure necessary for favorable reservoir development can then be verified with a minimum of seismic activity. Favorable reservoir developments occur on present day structural noses where there may not be any closure. The present process allows selection of which structural noses are prospective and to locate where the potential reservoir is developed on the nose. In the case of cut and fill or channel reservoirs, it is possible to outline the potential reservoir and hydrocarbon accumulation (See FIGS. 12 through 17).

Depositional reconstruction has application anywhere tilted reservoir, tilted oil-water contacts or tilted gas-water contacts are recognized or suspected, and anywhere there was discontinuous reservoir development.

SUMMARY OF FIGS. 1A AND 1B WHICH SHOW A SUBMARINE PROFILE AND SEDIMENT TEXTURE FOR BLANKET TYPE DEPOSITS

The submarine profile and sediment texture profile in FIGS. 1A and 1B demonstrate that there is a relationship between depositional structure and sediment texture. The submarine highs are shallow areas with high wave energies and the submarine lows have low energy levels. The coarser sediments are associated with the depositional highs, while mud and fine sediments are deposited in the lows. These same depositional relations were active in the geological past. True growth reefs do not fit this relationship.

In FIG. 1A, a sea floor 20 is illustrated relative to a horizontal sea surface 21, in a vertical section view, where the sea floor 20 extends over a horizontal scale of five nautical miles and over a vertical scale between 0 and 30 feet of depth. Data points or sample stations $S_1$–$S_{12}$ are shown along the surface of the sea floor 22 and respectively are located at various vertical locations or depths relative to the sea surface 21.

FIG. 1B is correlated to FIG. 1A and illustrates the type of sea floor surface sediment and texture over the horizontal distance between data points $S_1$–$S_{12}$. The sediment texture is plotted as a line 30 where the vertical scale for the line 30 is defined between a basic mud type of condition and the coarseness of grains in a sediment up to 2 millimeters in size. Relative to the representations of FIG. 1A and FIG. 1B, the effect of wave turbulence or wave energy of the sea on an uneven and warped sea floor 20 has a greater effect in shallow depths (such as locations 25 and 26) and a lesser effect at deeper depths (such as location 27 and 28). Similarly, sediment deposition or deposits of sediments containing a grain type of texture composition in prehistoric times had similar relationships and was directly affected by depth of a sea floor and relative wave energy. For example, at locations 25 and 26 it can be seen that at a shallow depth of the sea floor, there is a coarser sediment texture (see points 25', 26'). Between data points $S_{10}$ and $S_{11}$, sediment texture is of average grain size. At deeper depth of the sea floor, for example locations 27 and 28, it can see that the sediment texture is a fine or mud (see points 27', 28'). The illustration provided by this correlation of FIGS. 1A and 1B is that coarser texture sediments are more likely to be found at shallow depths (highs or locations 25 or 26) and that deeper depths (lows or locations 27 or 28 with lower wave energy) would define channels with finer sediments. The channels interconnect and slope to the low points of the sea floor topography. Conversely the highs may be interconnected by similar coarser textured sediment. As illustrated by FIG. 1A and FIG. 1B, there is a relationship between sea level at the time of deposition and the texture of the sediment deposited on the sea floor as shown by the sample points $S_1$ to $S_{12}$. However, as will be apparent from the discussion to follow, the "true dip" of a prehistoric depositional plane as determined by the present invention is a dip plane P—P (See FIG. 1A) which would have been parallel to the surface of an original sea level 21 above a depositional plane.

The object of the present invention is to determine the prehistoric plane of deposition from present day subsurface data and to use the prehistoric depositional plane as an adjustment plane to adjust the subsurface geological horizon to its original depositional relationship or plane for potential reservoir evaluation.

Referring again to FIGS. 1A & 1B, at a shallow depth from the water surface (or a high subsurface sea floor such as locations 25, 26), agitation, washing and erosion could occur which would result in dispersion of fine sediments and mud which settle out in a low sea floor locations 27, 28 (deeper depth) with lower wave energy. The low points such as locations 27, 28, after burial and elapse of a geological time period, become areas of decreased porosity and potential permeability barriers in the earth formations with respect to the locations 25, 26. Thus, the low sea floor points 27, 28 ultimately can, in geological time, define boundaries for the higher areas which are the accumulation areas (also sometimes referred to as "traps" or "lenses") for potential source of hydrocarbons.

The diagramative illustrations of FIG. 1A and FIG. 1B conceptualize how prehistoric formations of potential hydrocarbon reservoir forming materials occurred on submarine sea floors. As geological time elapsed, a sea floor 20 ultimately became a subsurface earth strata under the present day earth's surface. In this process the original surface configuration and the inclination of the plane of original sea level 21 was reconfigured by earth movements during burial and through geological time to a present day subsurface structural configuration. This involves basin subsidence or massive uplifts which alters the original sub-sea surface configuration and the inclination or plane of deposition so that the present day subsurface plane or inclination is at a different inclination with respect to a horizontal plane than the original sub-sea surface configuration.

The present invention is to determine and reconfigure an original depositional plane and to use the depositional plane as an adjustment plane to reconstruct an original prehistoric depositional structure from the present day subsurface structure.

SUMMARY OF FIG. 2 WHICH SHOWS A STRUCTURE MAP OF POTENTIAL HORIZON FOR AN AREA A

In FIG. 2, structure on top of the potential horizon under study is made first. Production from the study horizon of FIG. 2 is not totally structurally controlled and a combination structural-stratigraphic type trap is indicated. Intersecting lines for straight line structural profiles are drawn through control areas and labeled A, B, and C. The example is from the Pennsylvanian Limestone section of the Northern MidContinent Area.

Referring now to FIG. 2, in this illustration the surface of a present day subsurface strata is plotted as a standard topographic subsurface structure map with respect to a sea level reference datum over a survey of area of approximately 96 square miles.

To construct the subsurface structure or contour map illustrated in FIG. 2, the location of each test well drilled in the survey area is plotted as to location on the map. Thus, as shown in FIG. 2, the black dots 40 represent producing wells, the circles 41 with 90° marks indicate dry holes and the plain circles 42 indicate wells drilled through the subsurface stratum of interest. In FIG. 2, the substratum of interest is between 1050 and 1200 feet below a present day sea level reference plane. The well logs and records for each of the wells 40-42 are examined to determine porosity and reservoir factors relative to fluid production and the location of the substrata. Porosity and other facts relative to effective fluid production determine the ease of fluid migration in a given strata or horizon and define an "effective reservoir index". From the well logs for each of the wells, between −1050 and −1200 feet below sea level, a particular marker horizon or subsurface stratum can be identified and contour or structure lines can be constructed for a substratum surface which exists between levels of −1050 and −2000 feet of depth (a minus sign indicates below sea level reference datum).

When the contour lines (shown at 10 feet intervals) are completed, three straight control lines which intersect and define a triangle are drawn on the contour map. The control lines are arranged to extend through areas of maximum control, i.e. areas of known reservoir qualities. Known reservoir qualities are the porosity and reservoir factors relative to fluid production ("effective reservoir index"). The intersection points for a pair of control lines should be located as far apart as possible on the contour map where the intersection points are expected to have known effective reservoir indexes, such as (tight) impermeable (non-effective) or porous (effective) hydrocarbon-filled reservoirs. A control line should extend from one of the intersection points from a deeper depth of strata (such as well 44) to a lesser depth of strata (such as near well 46) for establishing a profile with an apparent dip. Similarly, another control line extends from a deeper depth (such as well 44) to lesser depth of strata (such as well 45) for establishing a profile with an apparent dip. The remaining control line extends between points which interrelate to the other two lines to provide as large an angle as possible at the intersection. At any intersection of two apparent dips, a true dip of a depositional plane can be calculated. As shown in FIG. 2, the control lines A—A', B—B' and C—C' can be constructed on the contour map. Also, as shown in FIG. 2, township land markers 47-50 can be used to correlate the contour subsurface map such as FIG. 2 on tracing paper to an actual surface map of the survey area. Also as shown in FIG. 2, the well 44 indicates an intersection point between the control lines A—A' and B—B'. The intersection point between lines A—A' and C—C' is designated by the number 52. The intersection point between the control lines C—C' and B—B' is designated by the number 53.

SUMMARY OF FIGS. 3(A-C) OF STRUCTURAL PROFILES FOR AREA A

In FIGS. 3(A-C), structural datums from the structure map (FIG. 2) are plotted along the profile lines A, B and C. Well symbols for the study horizon and the intersections of the other profiles are marked on each profile. The one hundred foot structural datum lines are indicated for reference.

Referring to FIGS. 3A-3C, the horizontal line A—A' is depicted in FIG. 3A as a vertical profile which is a representative of the subsurface vertical structural profile extending between the well 44 and the intersection point 52. It will be appreciated that the slope of the subsurface vertical structural profile A is generally in downward depth direction from the intersection point 52 to the well 44. The vertical structural profile or the line B (FIG. 3B) extends between the intersection point 53 and the well 44. The surface structural profile along the line B is also generally in a downward direction. The vertical structural profile line C (FIG. 3C) extends between the intersection point 52 and the intersection point 53 and is also generally in a downward direction between the points 52 and 53. In using the terms "point 52, 53 and well 44" it will be appreciated that the numbers are applied to a vertical axis as displayed. The vertical depth of the profile lines are correlated by reference points 55 on a given vertical axis. The depth levels of −1100 and −1200 are in feet with respect to a sea level surface reference.

As shown in FIGS. 3A–3C, each of the profiles A, B, C is plotted to show the subsurface profile for the top or upper surface of a substratum formation as a function of depth and the horizontal distance between the various locations, i.e., the well 44 and the intersections 52 and 53. The common depth points 55 for the respective profiles are also shown in FIGS. 3A–3C.

SUMMARY OF FIGS. 4(A–C) WHICH SHOWS STRUCTURAL PROFILES WITH APPARENT DIPS FOR AREA A

In FIGS. 4(A–C), the apparent dips are indicated by dashed lines which are adjusted to the well data indicated, such that the productive and porous tests are on one side of a dashed line with the dry holes, while tight tests are on the other side of a dashed line. It will depend upon what type of reservoir is being studied, whether the productive reservoir is above or below a dashed line. The apparent dip for each profile is measured and recorded in feet per mile. Production from the Pennsylvanian Limestone is from porosity lenses that are developed on depositional highs and producing wells should be located above the apparent dip line.

Dip is the angle of a stratum or surface of the stratum with respect to a horizontal plane. From an origin location, the dip of a plane from the origin location will also have an azimuth value with respect to magnetic north. Each of the profiles A, B, C has a dip which is referred to as "apparent dip". (See FIGS. 4A–4C). On each of the profiles A, B, C in FIGS. 4A–4C, the well locations are plotted relative to the horizontal surface distance along the line A—A′, B—B′ or C—C′. The type of well is also indicated on the plot, i.e., producer, dry hole or production from a different horizon. The apparent dip lines 60, 61, and 62 are located relative to the position or location of the wells intermediate of a pair of intersection points so that certain wells with first similar effective reservoir index characteristics are located above an apparent dip line and certain wells which have second similar effective reservoir indexes which are different from the first, similar effective reservoir index characteristics are located below an apparent dip line. Thus, the dip lines 60–62 are fitted or located relative to two different known characteristics of the test wells between the intersection points. For example, in FIG. 4A, the dry hole well 65 is above the dip line 60 because it has good porosity even though the well does not produce. The construction of an apparent dip line is thus correlated to the well characteristics along an apparent dip line between the intersection points. As shown in FIG. 4A, the apparent dip line 60 extends between the well 44 and the intersection point 52 and the line 60 falls below the wells 65, 66, 67, 68 on the profile A. The apparent dip line 60, however, is located above the dry hole wells 67(A–C) on the profile A. The apparent dip line 60 thus provides guidance as to differentiation between effective reservoir wells and noneffective reservoir wells. Similarly in FIGS. 4B and 4C, the apparent dip lines 61 and 62 are constructed and located. When the apparent dip lines 60, 61 and 62 are constructed and located, the dip is defined in terms of feet per mile for each line and can be calculated or readily determined by descaling. In the example, the apparent dip between the well 44 and the point 52 is 10.5 feet per mile; the apparent dip between the point 53 and well 44 is 10 feet per mile and the apparent dip between the points 53 and 52 is 3 feet per mile.

It will be apparent that the apparent dip lines 60, 61 and 62 lie on an inclined plane which is herein called a present day depositional plane. By constructing a line (strike line) on the present day depositional plane which has identical vertical depth offsets from a horizontal plane, the azimuth of the true dip of present day depositional plane can be determined by constructing a perpendicular to the strike line where the perpendicular extends through the origin location or the intersection of the structural profiles.

For purposes of this invention it is desired to translate the data from the present day depositional plane relative to the data of a present day sub-surface surface to provide a formation stratum surface approximating an original prehistoric plane of deposition and configuration where the formation stratum surface serves the purpose of defining the effective reservoir for location of likely hydrocarbon-bearing deposits or locations.

SUMARRY OF FIGS. 5(A–C) WHICH SHOW DEPOSITIONAL PROFILES FOR AREA A

In FIGS. 5(A–C) the structural profiles have been adjusted to show prehistoric depositional structural profiles by making the apparent dips of the profiles A–C horizontal as they would have been at the time of deposition. Depositional sea level has been indicated and depth lines drawn. The horizontal depth lines rate prospects as "good", "fair", and "poor". The shallow areas would have good reservoir developed; the deep areas would have very little or no effective porosity developed. Good prospect areas are indicated by brackets W, poor prospect area by brackets P, and good locations for development by brackets D.

Profile A shows a good wildcat prospect area, a development prospect, and a small or poor prospect. Profile B shows a good development location, a poor prospect and a development location. Profile C shows a fair development location.

Referring to FIGS. 5A–5C, the profiles A, B and C are illustrated in an angularly displaced position with respect to the respective views of FIGS. 4A–4C. In FIGS. 5A–5C the apparent dip lines 60, 61 and 62 are rotated to a horizontal position and plotted relative to a prehistoric sea level surface 70 as a relative function of depth. In this configuration, the depositional relationship as explained with respect to FIGS. 1A and 1B becomes apparent where the shallow depth points 71–77 indicate likely development locations. The locations 80–83 are poor prospect locations because of their proximity to dry holes and depth of the surface.

In respect to FIG. 5A, the apparent dip line 60 indicates that wells 84(*a-e*) are dry; in FIG. 5B wells 84(*f-i*) are dry and in FIG. 5C, the wells 84(*h-l*) are dry. In most instances the dry wells are located below a dip line 60, 61, 62. The depositional relationship as illustrated in FIGS. 5(A–C) when combined with the present day structural configuration provides a definition of effective reservoir locations for combination structural-stratigraphic types of hydrocarbons accumulations.

Figure 19:
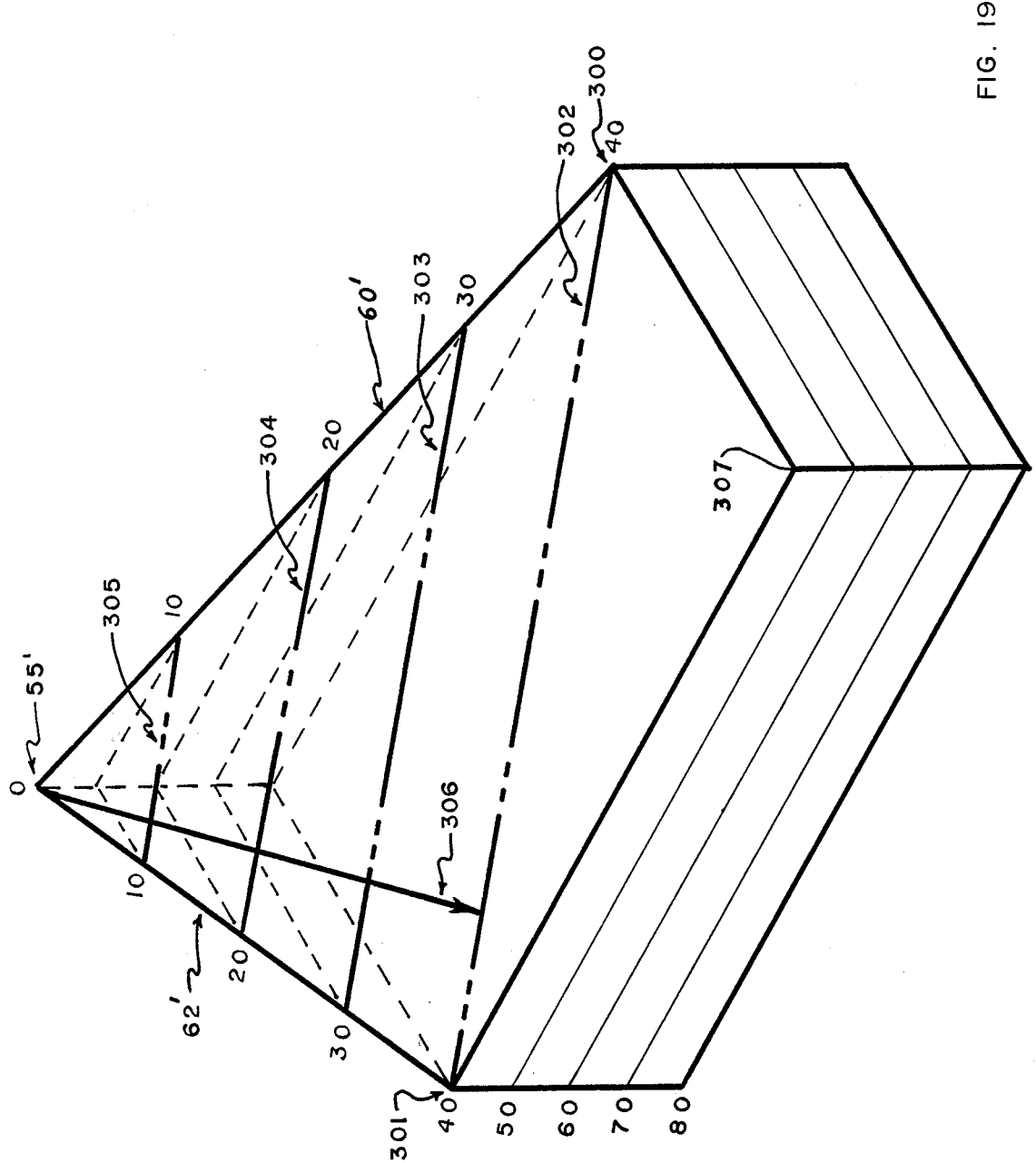
FIG. 19 is a three dimensional view of the relationship of strike lines and azimuth to the true dip depositional plane.

FIG. 19 is an illustration of the relationship of apparent dip to true dip and strike lines. In FIG. 19, straight line apparent dip lines 60′ and 62′ extend downwardly from a location or origin 55′ at zero depth and are disposed at an angle of 90° relative to one another. The dip line 60′ extends for a longer distance between the points 55′ and the point 300 than the distance between the point 55' and the point 301. Both the points 300 and 301 are 40 feet or 40 units vertically below the origin point 55'. Thus a strike line 302 extending between the points 300 and 301 is at an equal depth of 40 units below a horizontal plane extending through the origin point 55'. A strike line 303 at equal depths of 30 units below a horizontal plane through the origin point 55' is parallel to the line 302. The strike lines 302 and 303 lie on a plane on which the apparent dip lines 60' and 62' lie. The strike lines 304 and 305 on the plane are respectively strike lines at equal depth levels from a horizontal plane through the origin 55'. An azimuth line 306 constructed from the origin point 55' on the plane defined by the strike lines 302-305 is perpendicular to the strike lines is the true dip line. The true dip line defines an azimuth with respect to the origin point 55'.

If the plane defined by the strike lines 302-305 is the present day depositional plane then any point on a line 305 is 30 units above a horizontal plane defined by the points 300, 301 and 307. Thus, the tilted plane defined by the points 300, 301, and 55' can be considered for explanation purposes as a present day depositional or adjustment plane. The present day depositional plane can be adjusted to the plane defined by the points 300, 301 and 307 which can be considered a prehistoric depositional plane.

SUMMARY OF FIGS. 6A AND 6B WHICH SHOW ADJUSTMENT PLANE CALCULATIONS FOR AREA A

Calculation of an adjustment plane can easily and quickly be done using descriptive geometry to give true dip and strike magnitude and direction. At every intersection of two profiles, the two apparent dips can be solved for true dip magnitude and direction. These calculations from several intersections can be averaged for the value used.

To determine the prehistoric depositional dip plane from the apparent dip of the profiles A, B & C, a strike line and azimuth are determined with respect to a plane defined by a pair of intersecting profiles A, B and C. In FIG. 6A, one such determination is illustrated. In FIG. 6A, the intersection 52 and the profiles A and C are oriented on a drawing sheet with respect to the direction North as indicated by the line 90. The North line 90 is the same direction of alignment as the North line direction illustrated in FIG. 2. The steepest dip of the pair is used as the units of dip per mile. Along the profile A, eleven equal units of length are depicted. For each unit of length, by definition, there is one foot of dip (vertical displacement) for each unit. Thus, in the example of 10 units there is 10 feet of dip. The dip is one foot per one unit. Therefore, if 10.5 units along profile A is defined as equal to one mile in length, then there are 10.5 feet of vertical displacement at one mile. Using the same length scale (10.5 units equal to one mile) on profile C, a point 91 is located at 10.5 units or one mile from the intersection point 52. At point 91 therefore the dip or vertical displacement of the profile C is 3 feet (apparent dip of the profile C is three feet per mile). On profile A a point 92 locates a vertical displacement or dip of 3 feet relative to the profile A. Therefore, a strike line 93 which interconnects the points 91 and 92 is at an equal depth of 3 feet from a horizontal plane extending through the point 52. The true dip azimuth or true dip line 94 from the intersection 52 which is perpendicular to the strike line 93 is then constructed and can be measured as to its angle relative to North. In the example shown, the azimuth of the true dip plane is North 92° East. Each of the intersections of the profiles at the point 53 and the well 44 can be plotted similarly and will give similar true dip and azimuth for the true dip plane.

The calculations of FIG. 6A are on a horizontal plane and the true dip of the plane is at an angle with respect to a horizontal plane. To determine true dip dimensions of the apparent dip, a scale figure is constructed where 11 equal units along a line 100 are constructed (see FIG. 6B). Each unit is designated as a one foot of dip and therefore for a dip of 10.5 feet per mile (maximum dip of the pair of apparent dips), 10.5 units equal a mile and one unit equals one foot of drop or dip. Thus at 2.8 units (measures from the intersection 52 on the dip line to the strike line intersection), the true dip is down 3 feet. At 2.8 units (point 101) a perpendicular line 102 is constructed 3 units in length. A perpendicular line 104 is constructed at the 10.5 unit mark (point 105 at one mile) and scaled in the units as the line 100. A construction line 103 from the origin O through the 3 unit point on the line 102 intersects the line 104 at 10.6 units. Thus, the true dip for profile A is 10.6 feet per mile. The true dip for profiles B and C is calculated in the same manner.

SUMMARY OF FIG. 7 WHICH SHOWS AN ADJUSTMENT PLANE CONSTRUCTION FOR AREA A

Figure 7:
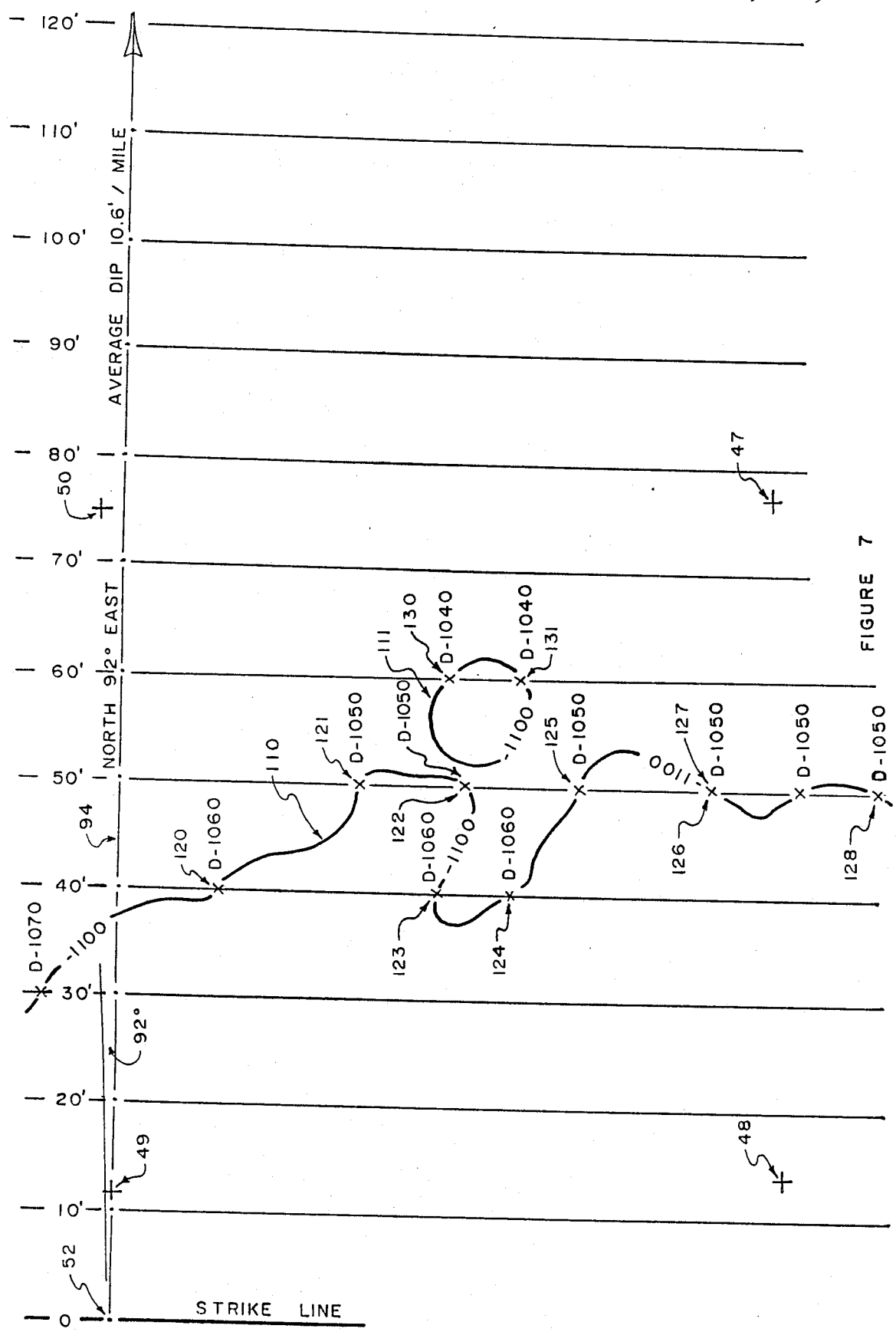
FIG. 7 is a representation of a true dip plane or depositional plane with azimuth and strike lines for adjustment of present day structure contour data shown in FIG. 2.

In FIG. 7, an adjustment plane is constructed (preferably on transparent drafting material) so that the adjustment plane can be placed over the structure map of the horizon (FIG. 2) for calculation of the prehistoric depositional structure. The simplest adjustment starts with the zero strike line at the up dip map corner. The average dip line is drawn from one map corner and a perpendicular to the dip line at the corner is labeled as zero correction. Strike lines perpendicular to the dip line are drawn at the same interval as the map contour interval used in FIG. 2 and using the calculated average dip scale. Other intervals can be used, however, similar intervals to the survey map are quicker and easier to use.

Referring now to FIG. 7, a transparent sheet of paper is positioned over the map of FIG. 2 (the township markers 47-50 are made on FIG. 7 for correlation). The intersection location 52 is marked on the upper left hand corner of the transparent sheet. The transparent sheet depicted in FIG. 7 will be on the strike or adjustment plane and thus the azimuth line 94 (at North 90° East) is constructed from the intersection point 52. In FIG. 7, a scale consisting of parallel strike lines at increments of ten feet from 0 to −120 feet is constructed where the parallel lines are perpendicular to the azimuth (true dip) line 94. This scale is set at 10 feet increments to correlate with the spacing of the contour lines in FIG. 2 for ease of computation. The ten foot strike lines are, of course, perpendicular to the azimuth line 94. In FIG. 7 only two contour lines 110, 111 from FIG. 2 are shown for ease of illustration. The contour lines 110, 111 as shown in FIG. 7 are reproduced (traced) on the transparent overlay as depicted by FIG. 7. As shown in FIG. 7 then, the point 120 is on a 40 foot strike line or has a true original depositional structure of −1060 feet (1100 feet minus 40 feet). Points 130 and 131 on a 60 foot strike line have a true original disposition structure location of −1040 feet, the depositional datum. The depositional structure at various points is as follows:

| Point | Original Depositional Structure in Feet (Relative to sea level) | |
| --- | --- | --- |
| 121 | | −1050 |
| 122 | | −1050 |
| 123 | −1060 | |
| 124 | −1060 | |
| 125 | | −1050 |
| 126 | | −1050 |
| 127 | | −1050 |
| 128 | | −1050 |
| 129 | | −1040 |
| 130 | | −1040 |
| 131 | | −1040 |

SUMMARY OF FIG. 8 WHICH SHOWS A DEPOSITIONAL STRUCTURE CONSTRUCTION FOR AREA A

Figure 8:
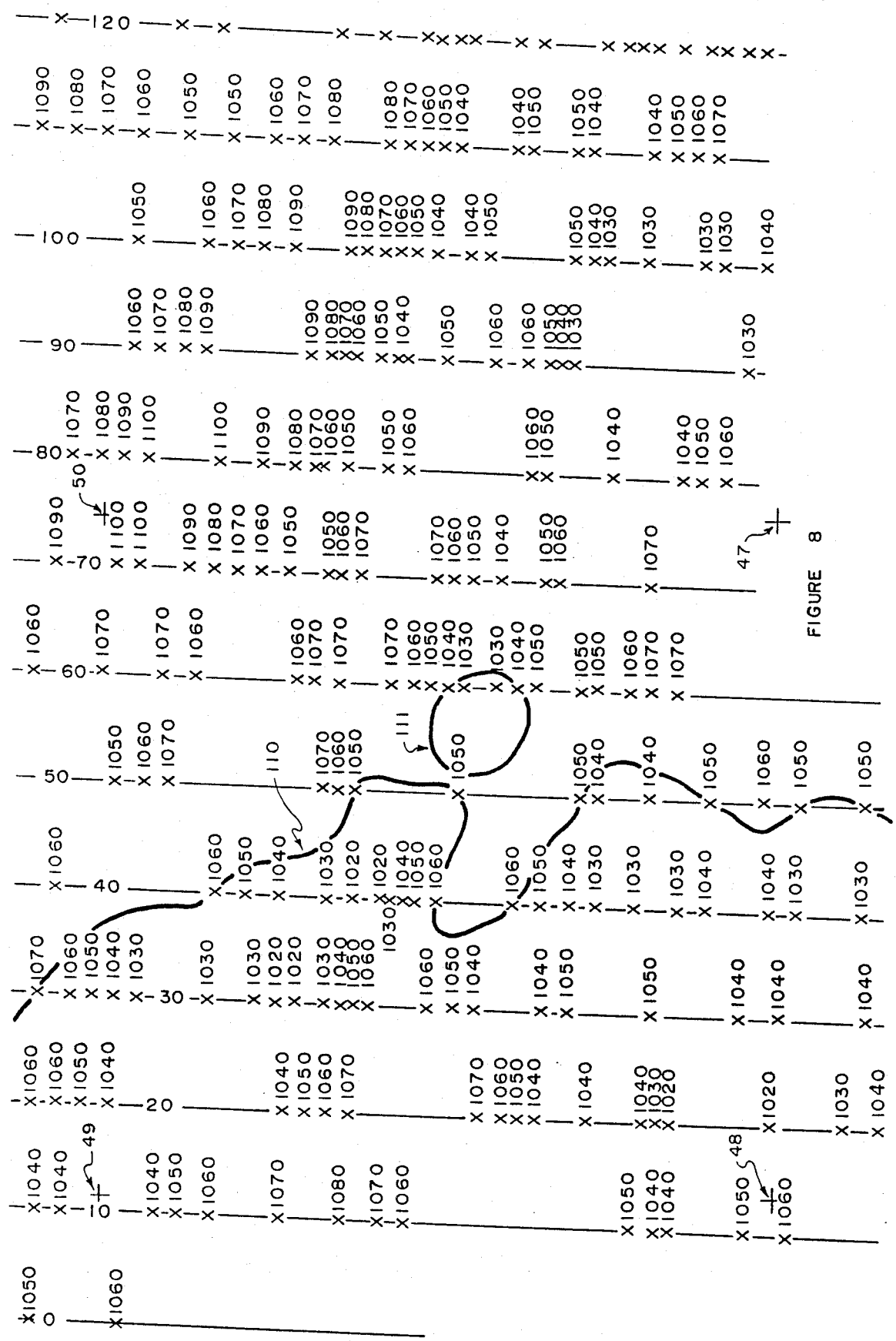
FIG. 8, is a map showing adjusted values for each intersection of a contour line and a strike line of the depositional plane (FIG. 7) with respect to the contour data (FIG. 2)

The depositional structure data is constructed in FIG. 8 by overlaying the structure of the present day horizon (FIG. 2) with the adjustment plane (FIG. 7) and calculating a depositional structure datum at every intersection of a structural contour line and an adjustment strike line. This method exactly fits the present day structural surface back to approximate the prehistoric depositional structural datums. FIG. 8 is a chart or listing of depositional structural points with respect to strike line adjustment depths as set forth in FIG. 7 where the depositional structural points are calculated or determined as set forth relative to FIG. 7.

SUMMARY OF FIG. 9 WHICH SHOWS A DEPOSITIONAL STRUCTURE MAY FOR AREA A

Figure 9:
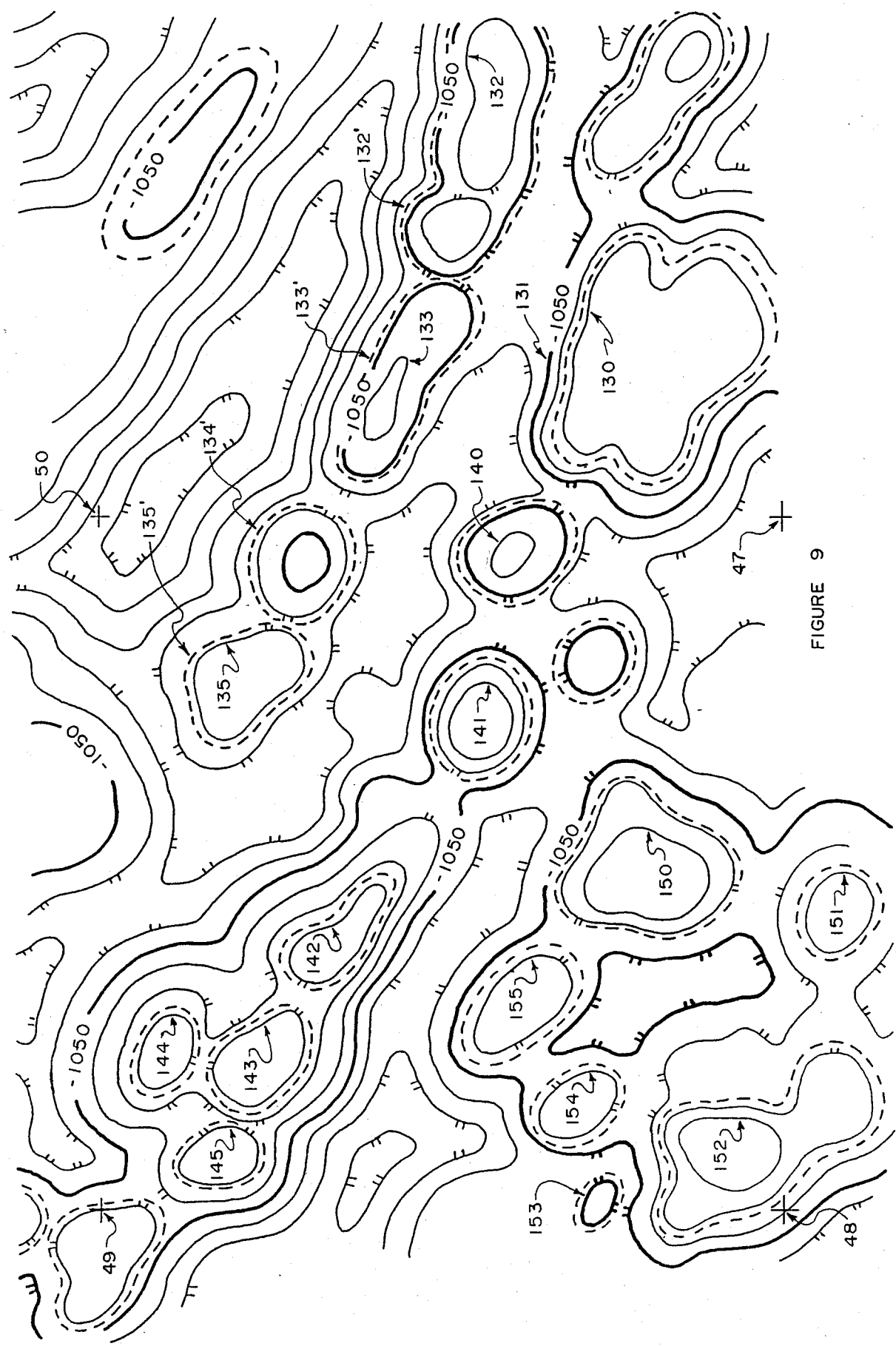
FIG. 9 is a depositional structure map constructed by contouring the adjusted data indicated on FIG. 8.

The depositional structure map of FIG. 9 is contoured using the same contour interval of ten feet as in the present day structure map of FIG. 2. The constructed datums in FIG. 9 are contoured using construction rules. For detailed field studies, the depositional structural datum is calculated for each well.

The calculated depositional structural points shown in FIG. 8 are combined and plotted on a depositional structure map as shown in FIG. 9. Thus as shown in FIG. 9, with the recalculated depositional structural points of FIG. 8, the structure of the original sea floor of prehistoric deposition can be reconstructed. The contours of FIG. 9 are based upon the calculations shown in FIG. 8.

In the depositional reconstruction shown in FIG. 9, the areas within closed contour lines indicate "high" spots, i.e., shallower locations closer to a wave surface during the time of deposition. For example, line 130 is at −1030 feet (referenced to sea level) and the periphery about the line 130 would slope downwardly toward the −1050 feet contour line 131. The closed line 132 is at −1040 feet as is the line 133. The closed line 134 is at −1050 feet while the closed line 135 is at −1060 feet. The dashed lines 132′-135′ are approximations of the maximum depositional structural enclosures for maximum hydrocarbon fill in the depositional high structural locations where the best effective reservoir is developed. Lines 130, 140-145 show the crests of the depositionally high locations. Lines 150-155 also show the crests of the depositionally high locations. With respect to each of the high locations a dashed line indicates the maximum depositional structure and provides an enclosure for hydrocarbon accumulation and additional depositional interpretation.

SUMMARY OF FIG. 10 WHICH SHOWS DEPOSITIONAL INTERPRETATION FOR AREA A

Maximum depositional closures are indicated in FIG. 10 by small dashed lines and ar the primary accumulation areas for reservoirs that develop on depositional highs. The axes of the depositional lows become the permeability barriers and the axes of the depositional highs are the migration paths.

To interpret the depositional structure map of FIG. 9, the maximum depositional enclosures (dashed lines) for the depositional highs are plotted. Thus, in FIG. 10, an overlay of FIG. 9 is made on transparent paper where the enclosed areas 132′-135′, 130′, 140′-145′, 150′-155′ are shown with their respective depositional structure datums. Also the permeability barriers (— ... —) such as line 160 can be plotted at the maximum depositional lows between the depositional closures (dashed line). In the illustration there are 3 groups of areas, i.e.:

| | |
| --- | --- |
| Group 1 | lines 132′-135′ |
| Group 2 | lines 130′, 140′-145′ |
| Group 3 | lines 150′-155′ |

Each of these areas represents initial individual accumulation areas for hydrocarbons. The depositional structural datum indicates relative reservoir quality deposition with the highest datum being the best and decreasing with the depth of depositional structure. Each of these areas (dashed lines) indicate maximum closure for a relative depositional high area.

In the areas 132′-135′, the highest elevation 135′ at 1065 feet would have fluid which would tend to migrate toward the area 132′. A migration path is indicated by a large arrow 170. Migration occurs when fluids in one reservoir lens fill to capacity of the lens and thereafter, additional hydrocarbons, in time, will be a resultant flow (migrate or spill) to the next higher lens. The large arrows 170 from one depositional structure point to the next highest area to indicate migration paths. Areas with decreased permeability are marked with a line using a long dash, three dots and a long dash. The low permeability lines are located along the axis of the depositional lows. The lines are initiated on a side of a depositional saddle and the areas bounded by the permeability barrier lines are the maximum primary accumulation area for an associated depositional closure.

SUMMARY OF FIG. 11 WHICH SHOWS A PROSPECT SUMMARY MAP FOR AREA A

The prospect summary map of FIG. 11 shows the outline of production along with potentially productive areas, permeability barriers, relative reservoir quality, migration paths and secondary adjustments.

The transparent overlay of FIG. 10 (depositional reservoir quality interpretation map) is correlated with the present day structure map of FIG. 2 and still another overlay is produced as shown in FIG. 11, the prospect summary map. In FIG. 11, the overlay has the depositional closure dashed lines (relative reservoir quality) traced thereon with respect to existing text wells. Given the producing wells are associated with combination structural-stratigraphic type traps (down dip structural control, up dip stratigraphic reservoir quality control), a down dip structural limit is traced from the structure map as a solid line such as line 170'. The combination structural-stratigraphic trap area within both the up dip depositional structure dashed line 133' and the down dip solid structure line 170' is the primary prospect area and is outlined with dotted lines for identification purposes. Permeability barriers are shown by line segments separated by three dots (— . . . —).

Figure 20:
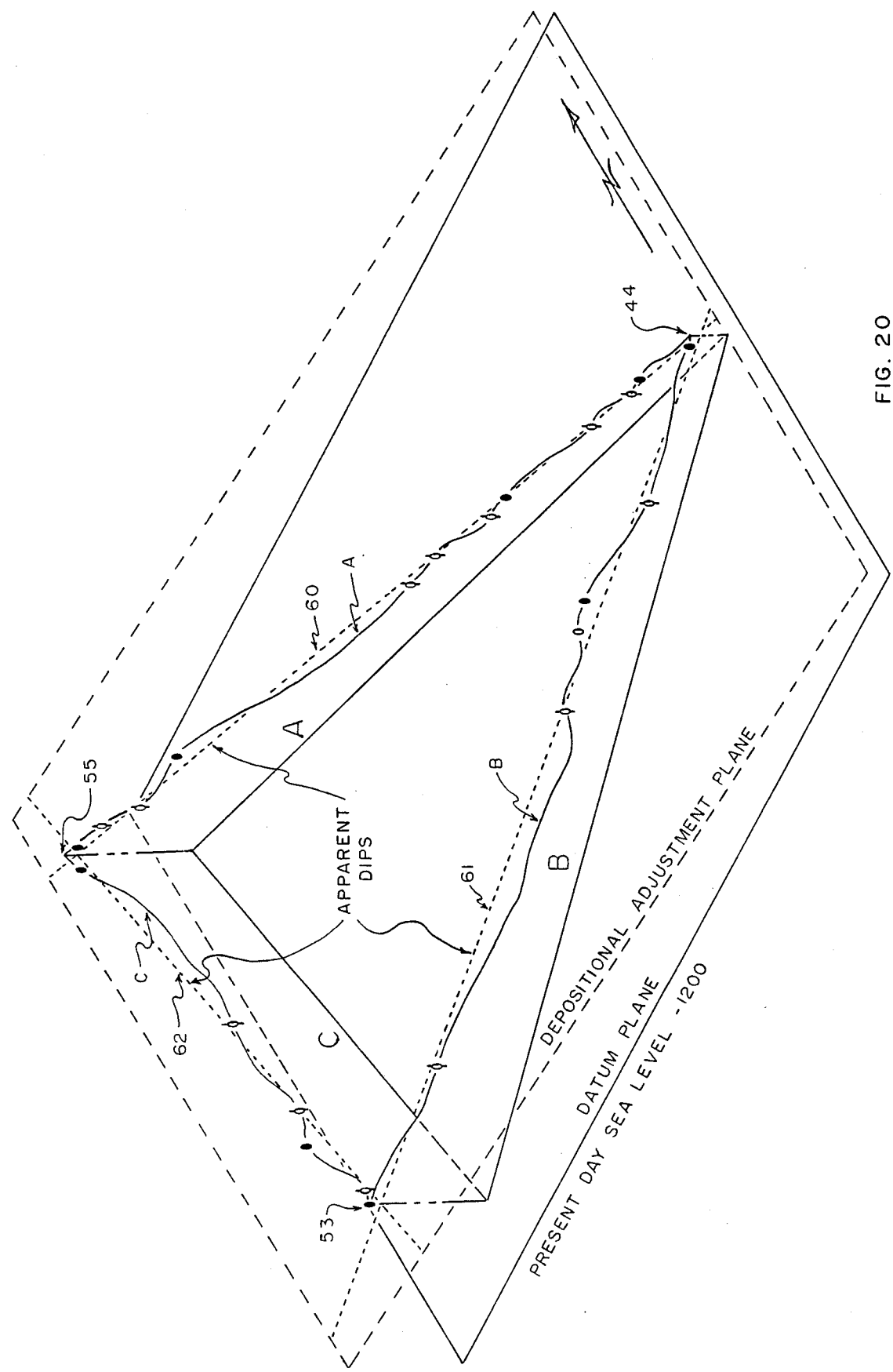
FIG. 20 is a three dimension view of the relationship of the FIG. 2 contour map to a depositional plane.
Figure 21:
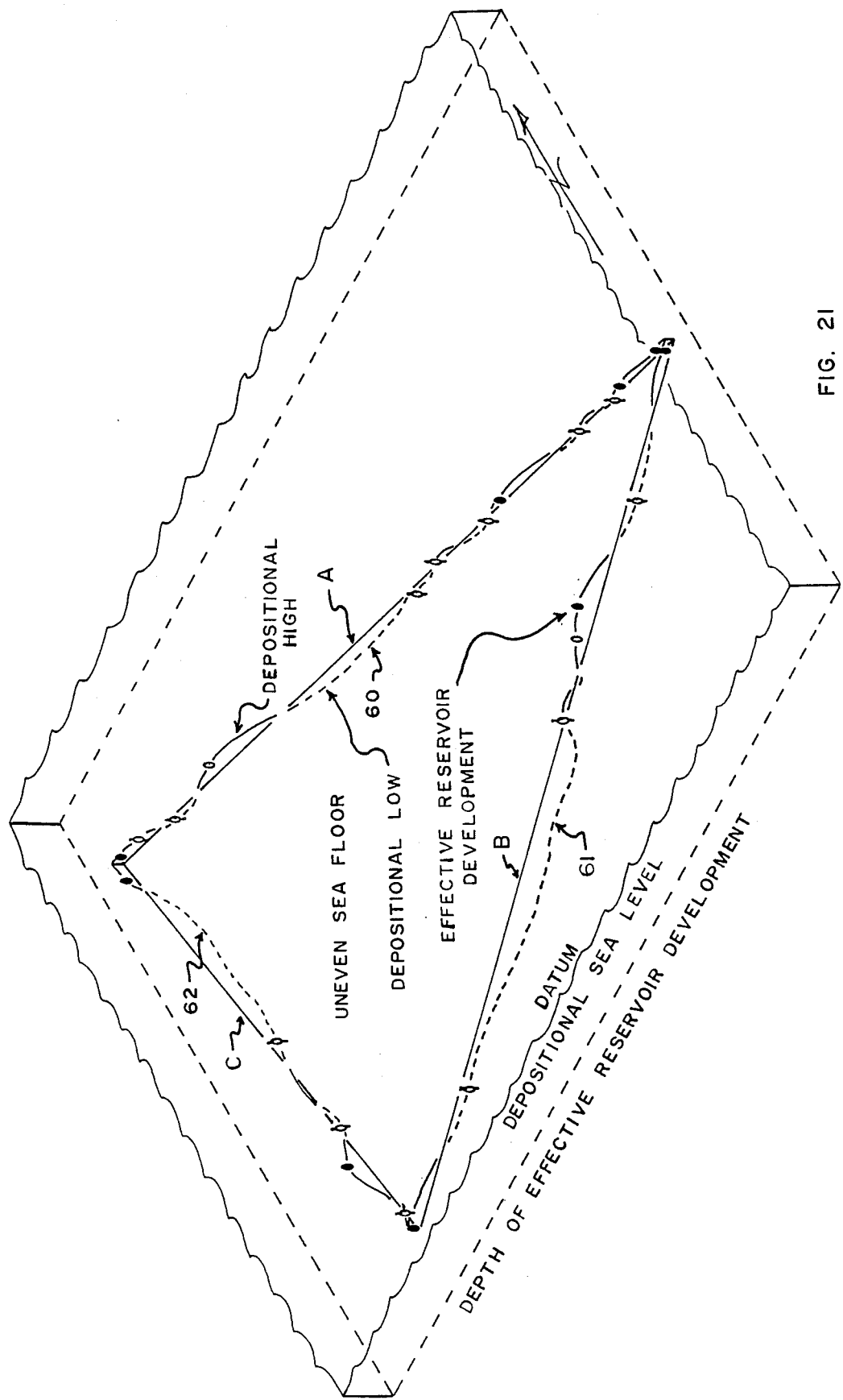
FIG. 21 is a three dimensional view of a present day sub-surface reconfigured to a prehistoric configuration.

As shown in FIG. 11, the areas enclosed by the lines 135', 134' were only partially filled or the hydrocarbons have migrated toward the enclosures 133' and 132' as confirmed by the completed production wells. It is also obvious from lines 133' and 132' that the non-prodictive dry holes are outside of the primary prospect areas (dotted lines). Considering another group of wells, a migration path is indicated by the arrows from 155' to 150' to 151' to 152'. From the summary map prospect the locations 180, 181, 182 for example should be productive when drilled. In another group, locations 183–186 are likely prospects for drilling. Thus, Referring to FIG. 20, in a three dimensional configuration, the apparent dip lines 60–62 and the profiles A–C are illustrated on a depositional dip plane with respect to a horizontal datum plane at −1200 feet. In FIG. 21, by reindexing the depositional dip plane to a horizontal datum plane and plotting the profiles A–C, the shaded areas above the profiles indicate the depositional highs which provide effective reservoir development.

SUMMARY OF FIG. 12 WHICH SHOWS A STRUCTURE MAP OF POTENTIAL HORIZON FOR AREA B

Figure 12:
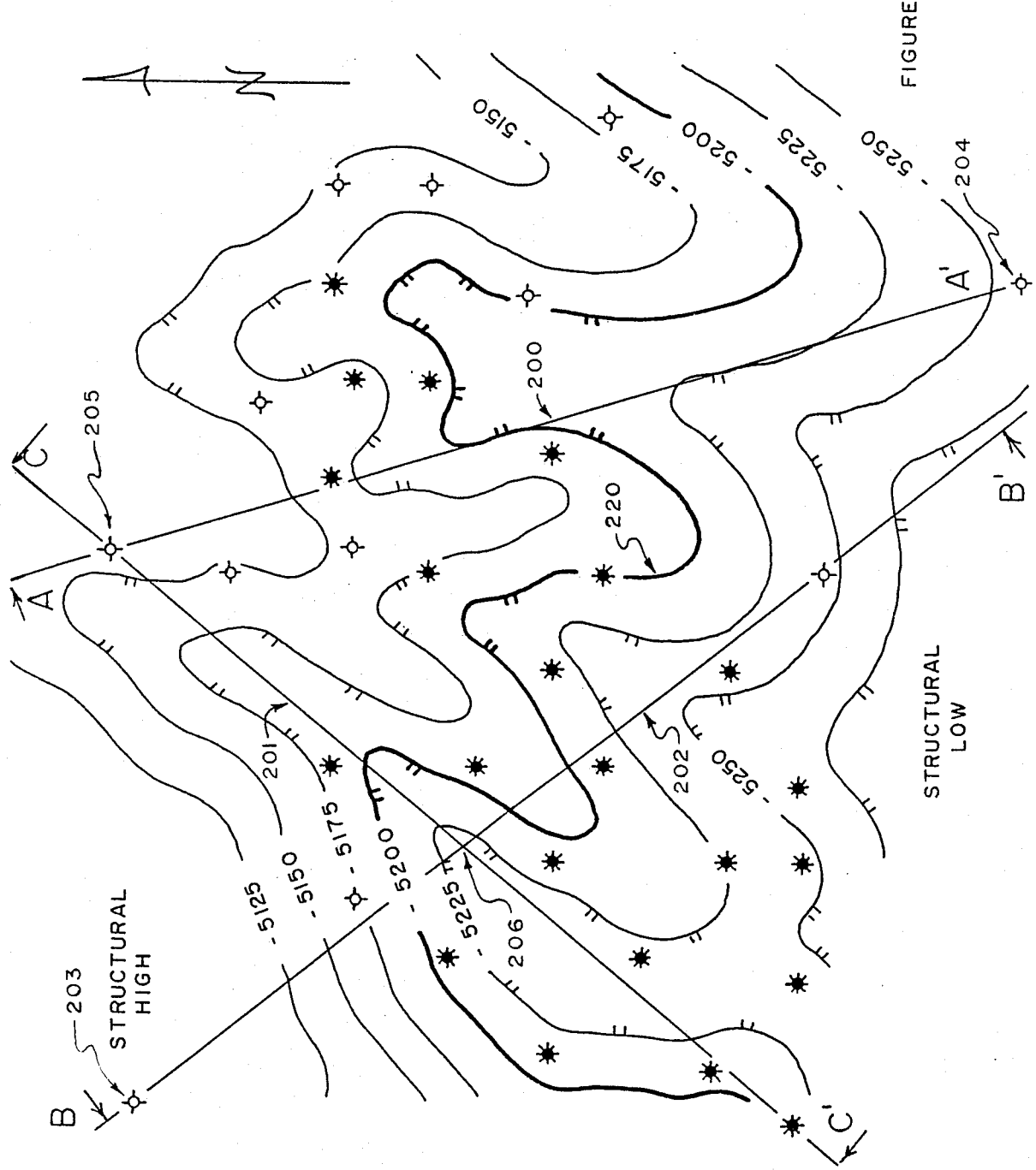
FIG. 12 is a subsurface contour map of a survey map for area B, a different type of subsurface reservoir configuration and illustrates well locations, well types and profile A, B and C locations.

FIG. 12 is an example where production is not controlled by structure since there are up dip dry holes which do not have effective reservoir development. The example is from the Western MidContinent Area. The lines of profiles A, B, and C are indicated in FIG. 12.

The present invention can be applied to a different topography where the production of hydrocarbon is not controlled by structure but rather involves stratigraphic traps (sometimes called "pinch-out" traps). In such a configuration the reservoir pinch-outs in the earth have created discrete accumulations of producible hydrocarbons. In FIG. 12, a subsurface topographical contour map is illustrated where the hydrocarbon reservoir developments are not controlled by the highs and lows of a plane of depositional material but rather represent stratigraphic traps. In FIG. 12 are profiles 200, 201 and 202. Profile 200 extends between a point (off the sheet) to a dry well 205 along a line A—A¹. Profile 201 extends between the dry well 205 and an intersection point 206 along line C—C¹. Profile 202 extends between the point 206 and a point (off the sheet) along a line B—B¹. Datum levels are contoured at 25 feet spacing intervals.

In FIG. 12, the wells 205 and 203 are non-producers and are at a structurally high point with no effective reservoir qualities. The well 204 is a non-producer at a structurally low point below the oil/water contact but has an effective reservoir quality. Thus, with the production wells, indicated by solid dots with radiating lines, between the structurally high wells (205, 203) and the structurally low well (204), the object is to define the effective reservoir between the wells. In this type of formation, the sands or hydrocarbon production is in the low points.

SUMMARY OF FIG. 13 WHICH SHOWS A STRUCTURAL PROFILE FOR AREA B

In FIG. 13(A–C), structural datums from the structure map are plotted along the profile lines A, B and C. Well symbols for the study horizon and the intersections of the other profiles are marked on each profile. The one hundred foot structural datum lines are indicated for reference.

The profiles 200–202 of FIG. 12 are shown in FIGS. 13(A–C) with respect to depth, well location and intersection locations.

SUMMARY OF FIGS. 14(A–C) WHICH SHOWS STRUCTURAL PROFILES WITH APPARENT DIPS FOR AREA B

The apparent dips are indicated by a dashed line which is adjusted to the well data indicated, such that the productive and porous tests are on one side of the dashed line with the dry holes and tight tests on the other side of the dashed line. Production in this example is from a channel or cut-and-fill type of deposit where the sand is deposited in the depositional lows and production should be below the apparent dip line. The apparent dips range from 34' to 53' per mile.

In FIGS. 14(A–C), the apparent dip is shown as lines 210–212 in units of feet per mile. Also shown in FIGS. 14(A–C) is the presence or absence of sand bearing formations.

SUMMARY OF FIG. 15 WHICH SHOWS AN ADJUSTMENT PLANE CONSTRUCTION FOR AREA B

Figure 6B:
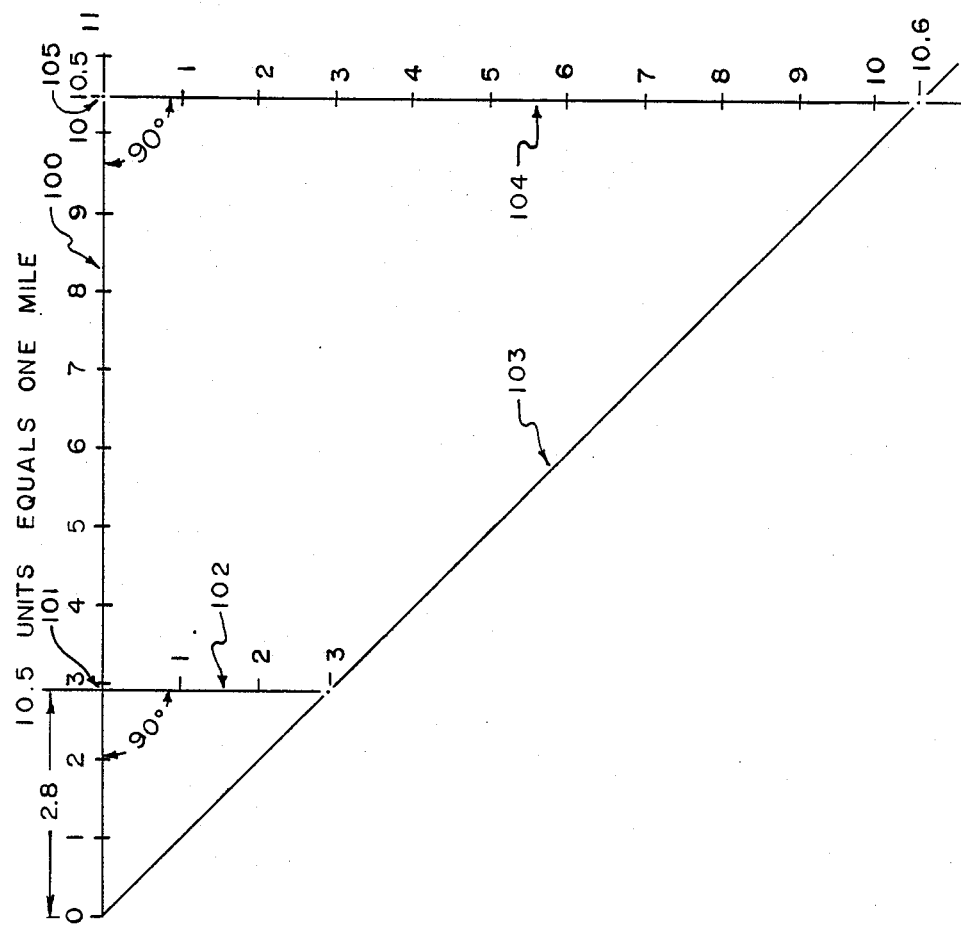
FIG. 6B is an illustration of descriptive geometry scaling for obtaining true dip values from apparent dip values.
Figure 6A:
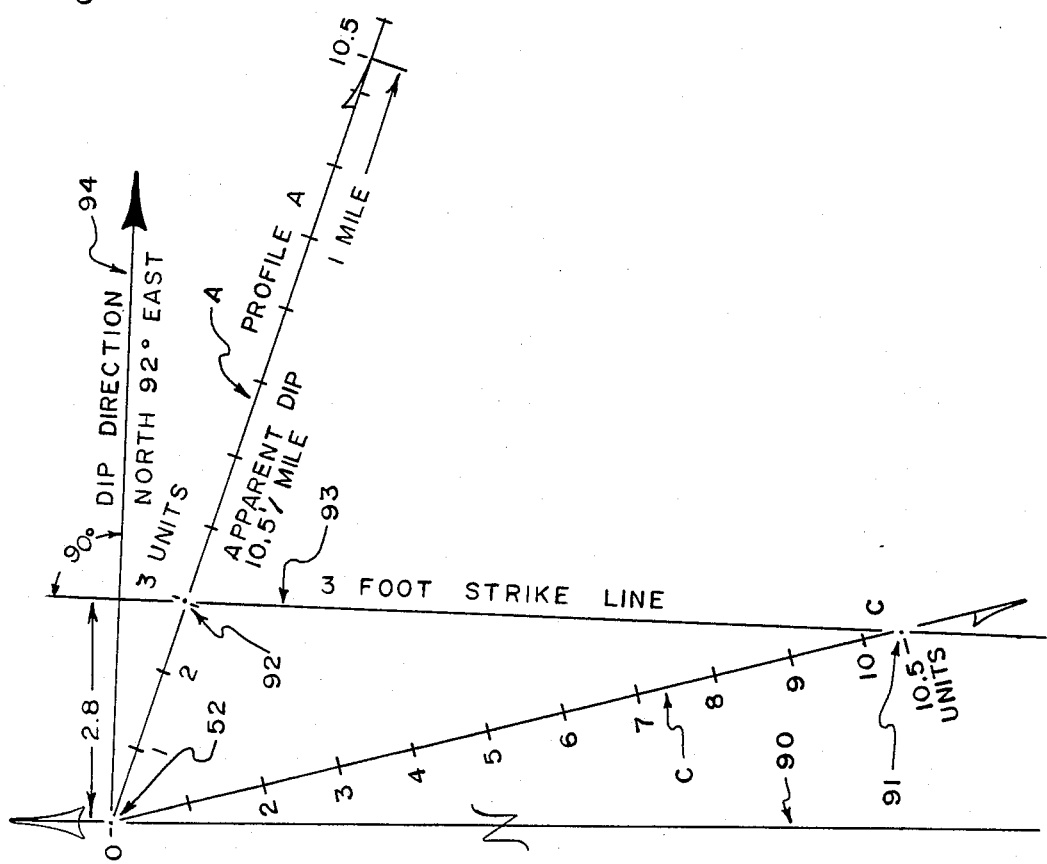
FIG. 6A is an illustration of a descriptive geometry scaling process for obtaining a strike line and azimuth of a true dip plane from two intersecting control lines.
Figure 15:
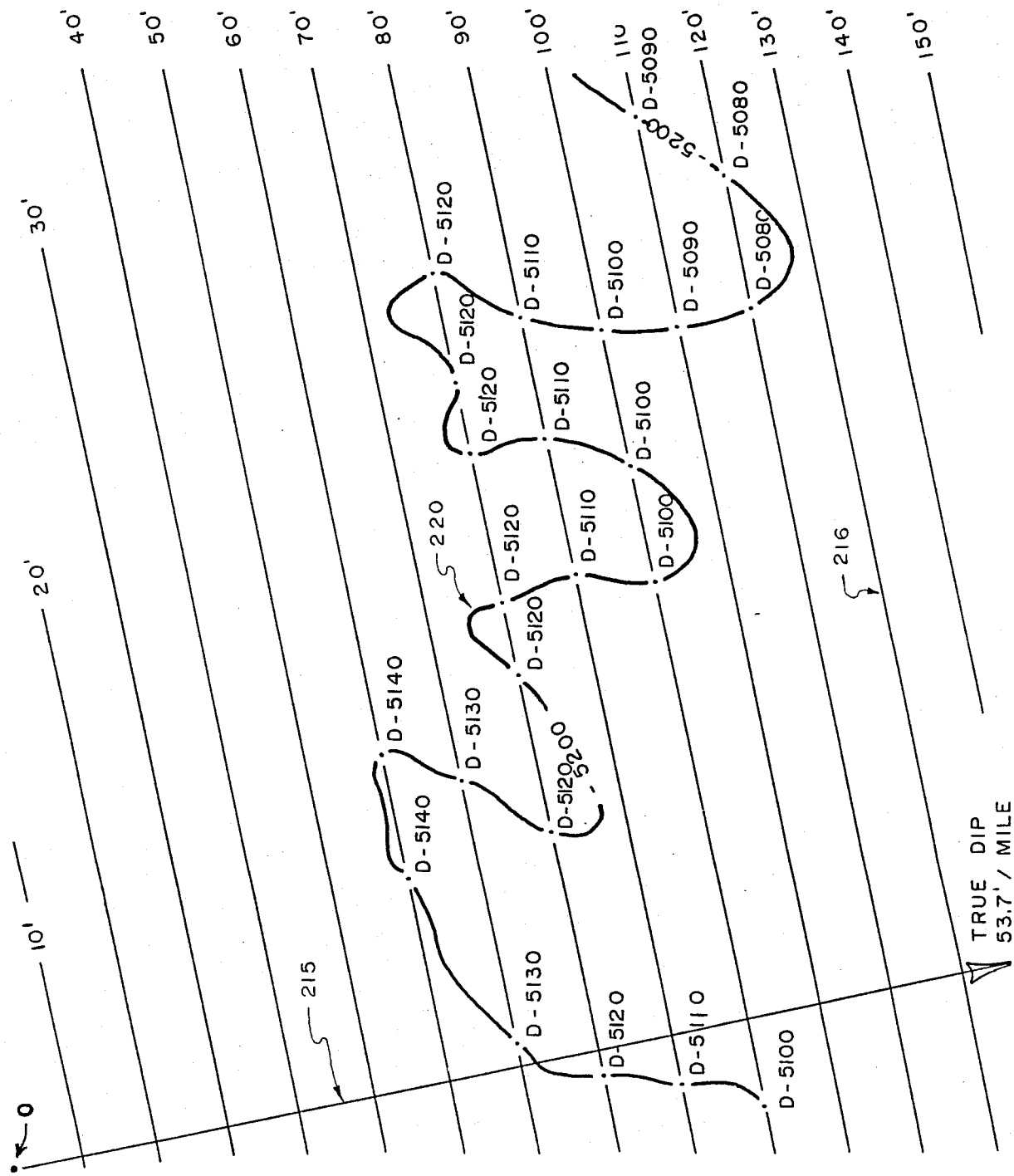
FIG. 15 is a representation of a true dip plane or depositional plane for area B with azimuth and strike lines for determining adjustment values of the true dip depositional plane with respect to present day structure.

In FIG. 15, calculation of an adjustment plane is accomplished by calculating the true dip and strike from each intersection of the structural profiles with apparent dip similar to the method illustrated in FIGS. 6A and 6B. The plane is constructed in the same manner as illustrated with respect to FIG. 7. An example of the calculation of the depositional datums along the −5200 structural contour datum is shown. At the point K, the depositional structure datum of −5210 feet is obtained by an adjustment of 80 feet to the −5200 contour line.

While not shown, the apparent dips of profiles are utilized for each intersection to determine the azimuth direction and the true depositional dip plane. As shown in FIG. 15, the true dip azimuth 215 and the perpendicular strike lines 216 are plotted where the strike lines are set at 10 foot intervals. As described before, with an overlay over FIG. 12 a contour line 220 when placed on the overlay can be used to determine the corrections as necessary to adjust the present day depositional stratum to the prehistoric stratum. With the correctional calculations for adjustment of an existing depositional plane, the prehistoric depositional structure can be plotted as shown in FIG. 16.

SUMMARY OF FIG. 16 WHICH SHOWS A DEPOSITIONAL STRUCTURE MAP FOR AREA B

Figure 16:
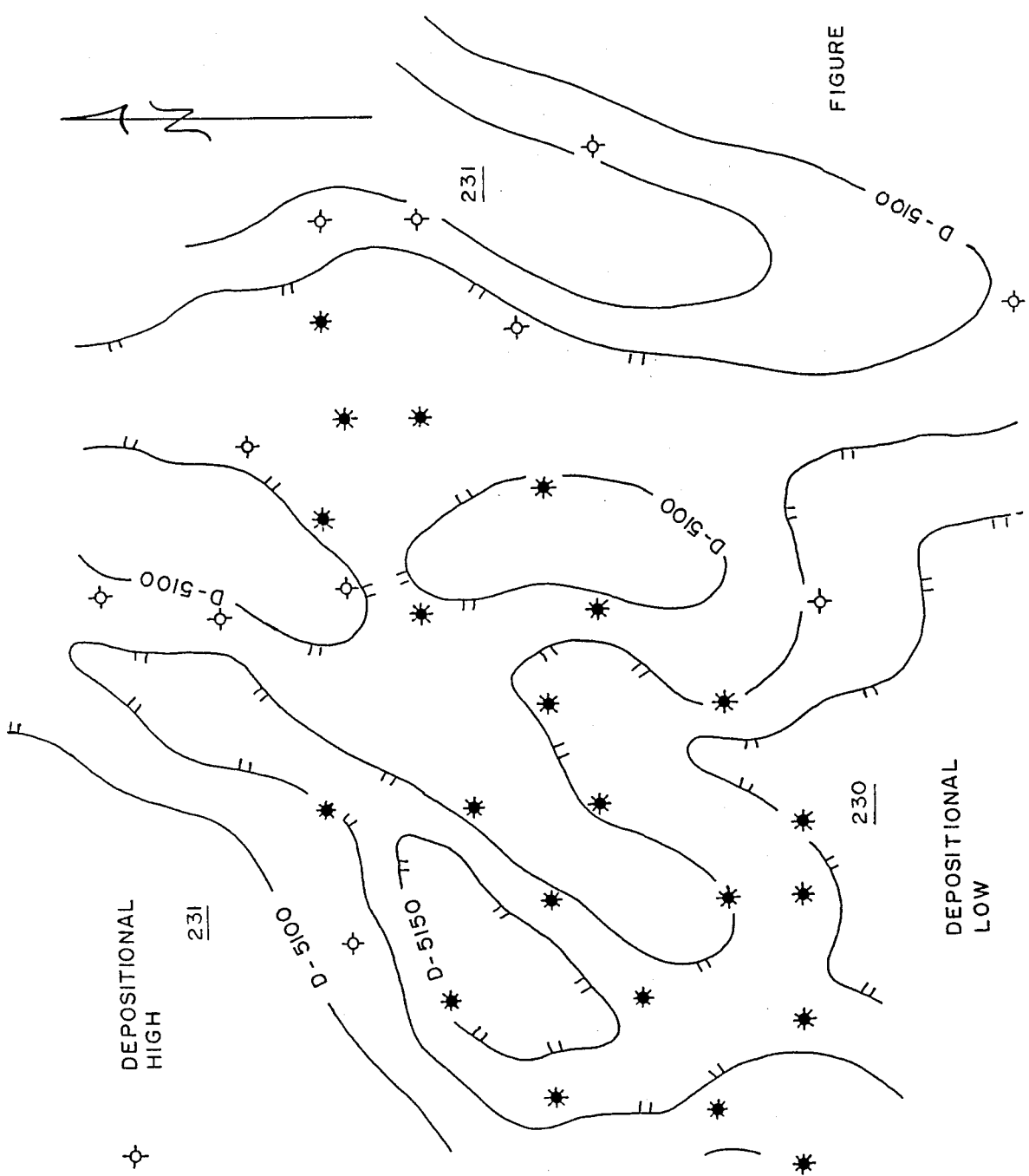
FIG. 16 is a depositional structure map for area B constructed from the adjusted data obtained from FIG. 15.

In FIG. 16, the depositional structure is calculated in the same manner as illustrated with respect to FIG. 7. The cut-and-fill or channel sand deposits in area B occur in the depositional lows 230 and are absent on the depositional highs 231. Utilizing the depositional structure and existing control the level of sand fill can be determined. In FIG. 16, the structure is on a horizontal plane as in a prehistoric era.

SUMMARY OF FIG. 17 WHICH SHOWS A PROSPECT SUMMARY FOR AREA B

Figure 17:
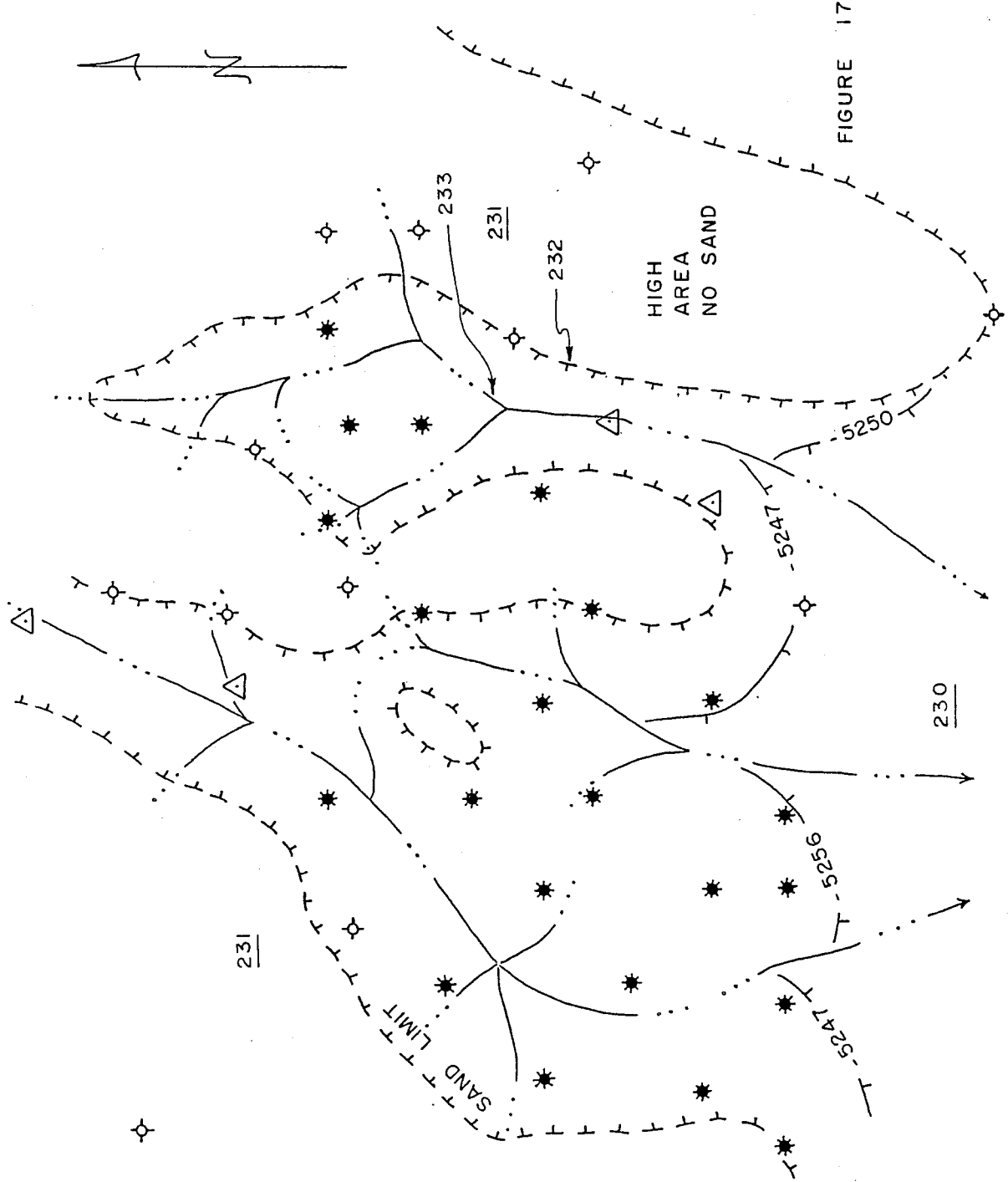
FIG. 17 is a prospect summary map constructed and interpreted from the data in FIG. 16 combined with structural data from FIG. 12.

The limit of sand fill in FIG. 17 has been indicated by small dashed lines 232 with a perpendicular dash. The axes of the depositional lows and permeability barriers are indicated by long dashed lines 233 separated by three dots. The finer sediments accumulate in the lows and the coarsest and better reservoir occurs on the ridges and around the edges of the sand accumulation.

The prospect summary map of FIG. 17 shows the outline of production along with potentially productive locations indicated by triangles with a central dot, permeability barriers, oil water contacts and leads for other similar accumulations.

Given the contour of FIG. 16, the prospect map of FIG. 17 can be constructed where the sand production limits can be defined.

Figure 18:
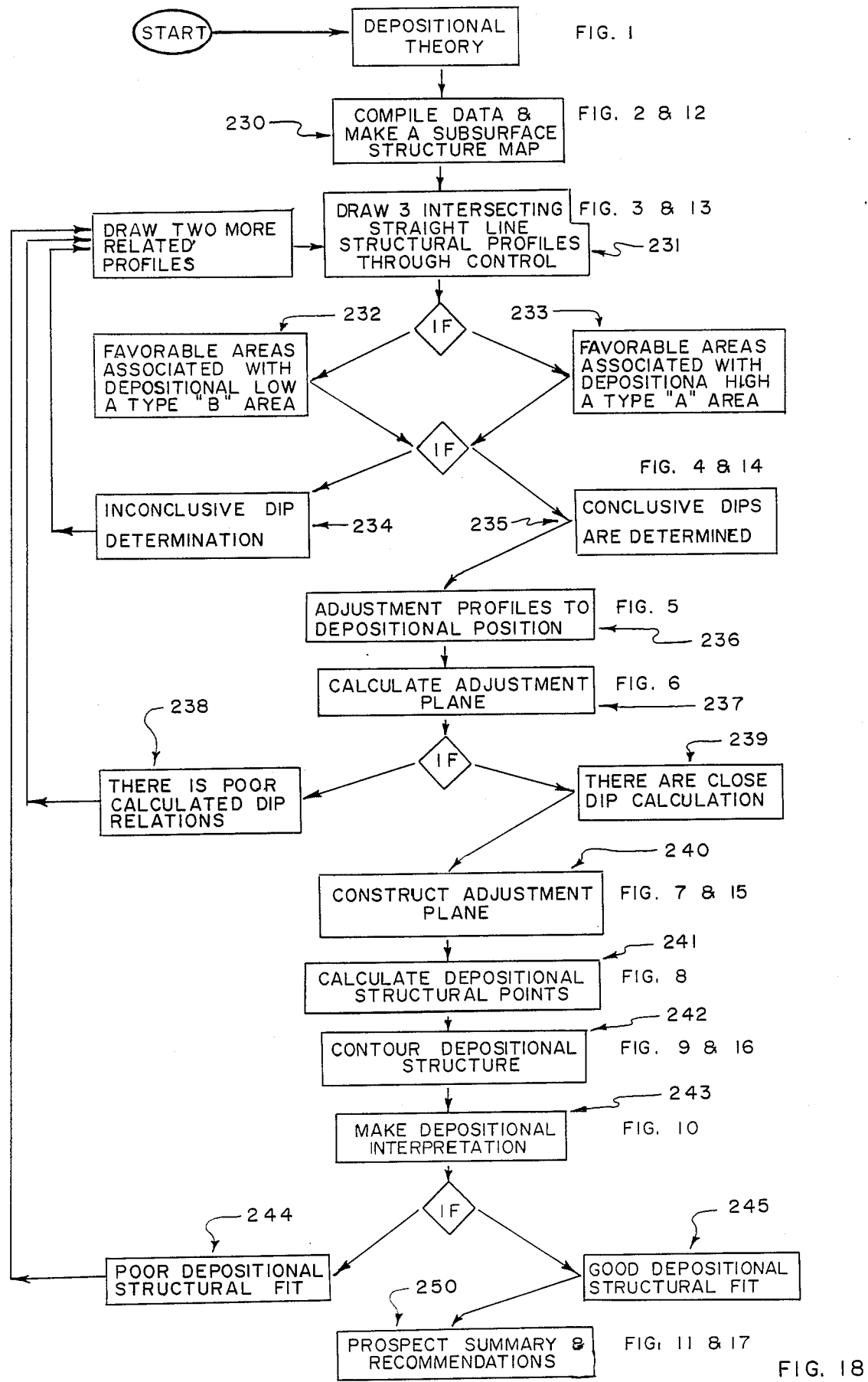
FIG. 18 is a flow chart of the process.

In summary of the process the following steps are taken as shown in the flow chart of FIG. 18.

The data from test wells in a study area is compiled and a subsurface map is constructed on a prospective horizon (see FIGS. 2,12) as referred to in flow chart block 230.

DETERMINATION OF THE ADJUSTMENT FACTOR

1. A minimum of three straight line intersecting profile lines are located on a subsurface contour map and extend across known reservoir developments (see FIGS. 2, 12). Preferred lines of profile would go through a structurally high tight dry hole, across a producing area to another dry hole. (See block 231)

2. The three or more straight line structural profiles are plotted relative to depth the appropriate well symbols, dry hole, oil or gas are shown on a profile, FIGS. 3(A–C) and 13(A–C). On each profile the intersection with another profile is labeled, for example, as intersection A, B, C.

3. From the well data, determine whether the type of reservoir to be evaluated is expected to have reservoir developed on a depositional high (block 233, FIG. 18) be deposited in a channel (block 232, FIG. 18) or may have been deposited on the flanks of depositional highs.

It is noted that sheet or blanket sands tend to be better developed on the the crest of depositional highs. If the depositional high was too high, resulting in submarine erosion, the sand would be preserved on the flanks. Channel sands or cut-and-fill sands would tend to be in the depositional lows and developed on the flank of depositional highs. Carbonates tend to have better developed reservoir on the depositional highs with biohermal-algae growth and development associated with the depositional high.

4. Starting with profile A, area A, for a reservoir developed on a high, adjust a straight edge so that the production and reservoir development is above the straight edge an the right reservoir rocks are below the straight edge. Draw a line, transfer the point of intersection of the line drawn and the intersection line of the other sections to the specific sections (see FIG. 4).

5. With profile B adjust the straight edge in the same manner being sure that the line passes through the point on the A intersection line. Transfer the intersection point of the line and profile C to the profile C intersection line.

6. The profile C now has intersection points from the line drawn on profile A & B. Draw the line between these intersection points and check to see if it fits the indicated reservoir conditions. (See block 235)

7. If the line does not fit profile C very well, take a different color pencil and draw a line that fits better. Pick the intersection points and A and B as before and work through B and A. (See block 234). Thus, if it is determined that the straight lines do not extend through conclusive or definitive control areas for apparent dip determination (block 234) then the process is restarted with new lines with better control.

8. It may be necessary to make several attempts in order to get the lines and intersection points to fit with the reservoir conditions. If the first profiles drawn are not well controlled, it may be necessary to draw an additional profile with control. Mark its intersection with the other profiles and carry the intersections through the other profiles.

9. If the desire was to evaluate a reservoir that is developed in a channel or is a cut-and-fill sand, then the procedure is reversed with the reservoir development and production set up below the line. (See FIG. 14, area B)

10. The line that has been established on each of the profiles and carried through all of the intersection points is actually points on the adjustment plane. The line on each profile has an apparent dip of the plane that can be measured in feet per mile as determined from the structural profile scale and the map scale. (See FIG. 4, area A and FIG. 14, area B).

11. The true dip and strike of the adjustment plane can be calculated at each intersection of two profiles with two apparent dips. (See block 240). These calculations are made using descriptive geometry for ease and speed. (See FIGS. 6A and 6B).

The example of the adjustment plane calculation used on FIG. 6 uses the intersecting profiles A and C. The oriented profile traces were copied from the structure map, FIG. 2, making sure that the North orientation is maintained and marked. For ease of calculating true dip and strike, a scale equal to the largest dip is used so that a scale unit is equal to one foot of depth. Profile A has the largest dip of the two apparent dips, 10.5 feet per mile., therefore, use 10.5 units of scale to equal a mile.

Scale one mile, 10.5 units along profile C and mark the point. The apparent dip along profile C is 3 feet per mile, so the point marked at 10.5 units is down 3 feet from the intersection of the two planes.

Along profile A, scale 3 units and mark the point. The apparent dip along profile A is 10.5 feet per mile, and since a scale of 10.5 units is being used, the point at 3 units is equal to 3 feet down.

Since the 10.5 unit mark on profile C is down three feet from the intersection point and the 3 unit mark on profile A is down three feet, a line connecting the two points would be the 3' strike line.

A perpendicular line drawn from the strike line to the intersection point of profiles A and C would be the true dip direction of the adjustment plane. The dip direction measures North 90° East for profiles A and C. The same calculation should be done for the other intersections and averaged.

The magnitude of the true dip is calculated by drawing a horizontal line one mile long using the scale of 10.5 units per mile. At 2.8 units of scale mark drop a perpendicular line 3 units which equals the 3 foot strike line. Draw a line from the zero point of the scaled mile, through the 3 foot strike line point to intersect with a perpendicular line dropped from the 10.5 unit mile mark. Measure the length of the perpendicular from the 10.5 scale point. Use the 10.5 unit scale to measure the true dip in feet per mile, which is 10.6 feet per mile. Three intersecting profiles would have three dip and strike calculations. The values and directions resulting should be close in value and direction. The three dip values, in feet per mile, can be averaged for the final value. The three direction indications can be placed on a summary sheet and an average direction chosen. This becomes the dip magnitude and direction for the adjustment plane.

If the true dip calculations are poor (block 238), i.e. the azimuth for the strike plane and the true dip calculation is not substantially the same at all corners of the triangle, then the process is restarted with new structural profile lines.

If the azimuth and the true dip calculations are substantially the same at the corners (profile intersections) of the triangle of lines (block 239) then an adjustment plane is constructed (block 240 and FIG. 7 and FIG. 15).

CONSTRUCTING THE ADJUSTMENT PLANE

1. The adjustment plane should be put on a transparent overlay that is registered to the structure map. Mark the dip line on the overlay starting at one corner of the map (See FIG. 7, block 240).
2. Draw a perpendicular strike line from the dip line at the map corner. Label this strike line as zero adjustment. Scale the average dip on the dip line and draw perpendicular strike lines at intervals equivalent to the structural contour interval for ease of calculation or at some other convenient interval.
3. Label the strike lines with their value around the edge of the map.
4. There is 120' of adjustment across map area A.

CONSTRUCTING THE DEPOSITIONAL STRUCTURE

1. Overlay and register the adjustment plane, constructed in B, on the structure map. At each point that a contour line crosses a strike line of the adjustment plane, make an X and post the calculated value (see block 241, FIG. 8).
2. Contour the adjusted points on the overlay using the same contour interval as the structure map using the rules of construction (see block 242 and FIG. 9). This should result in a depositional structure map.

DEPOSITIONAL INTERPRETATION, FIG. 10 AND BLOCK 243

1. Maximum depositional closure should be drawn using small dashed lines with a depositional datum indication.
   a. These maximum closures are the initial accumulation areas.
   b. The depositional structural datum indicates relative reservoir quality with the highest datum being the best and decreasing with depositional structure.
   c. If there is more than one depositional closure indicate the maximum closure for each one.
2. Migration paths should be indicated with a large arrow.
   a. Assume a maximum fill-and-spill.
   b. Mark the depositional structure saddle with the arrow pointing to the next highest area.
3. Permeability barriers should be marked with a line using a long dash, three dots and a long dash.
   a. These lines are marked down the axis of the depositional lows.
   b. Start the lines on the side of a depositional saddle with three dots and continue on down the axis of the depositional low.
   c. The areas bounded by the permeability barriers become the maximum primary accumulation area for the associated depositional closure.

PROSPECT SUMMARY MAP, FIG. 11. (SEE BLOCK 250)

1. Register an overlay to the structure and depositional map.
2. Trace on the depositional closure dashed lines.
3. Conservatively assume about a two thirds fill and draw a down dip structural limit as a solid line.
4. The area between the down dip solid structure line and the up dip depositional structure dashed line is the primary prospect area which should be indicated by a dotted closure and should be colored green on prints of the prospect summary map.
5. When the depositional structural dashed line and the structural solid line is placed on the summary map, it may be possible to make slight adjustments based on the local well control.

PROSPECT GRADES

1. The depositional structure is relative to reservoir quality so the higher it is the better the quality of reservoir.
2. The more depositional structural closure that is indicated, the better the prospect.
3. The larger the accumulation area as determined by the area between the permeability barriers, the more likely the reservoir is to be filled.
4. If the prospect is located on a migration path, the more likely the prospect is to be filled.
5. The more structure there is related to the prospect the better the prospect. Structural closures within the prospect areas should also be indicated for evaluation.
6. Values can be assigned to the various controlling factors and converted into meaningful grades for relative comparison.

Depositional Closures

| Depositional Closures | |
|---|---|
| First closure | 20 points |
| Second closure | 10 points |
| Other closures | 10 points each |
| Structural closure | |
| Structural nose | 10 points |
| First closure | 10 points |
| Other closures | 10 points each |
| Size | |
| Each well location | 10 points each |
| Extra values | |
| On a migration path | 10 points |
| Close to production | 10 points |
| Good control | 10 points |

GRADING EXAMPLE

Prospect on a structural nose (10), one depositional closure (20), four wells in size (40) and on a migration path (10); total points 80. On a grading scale where 80 to 89 equals a "B", the example would be an above average prospect.

Two types of stratigraphic conditions have been presented with area A, FIGS. 2-11, representing the wide spread blanket type of deposit which can be either sand or carbonates, and has better porosity developed on depositional highs and poor porosities in the lows. Area B, FIGS. 12-17, presents the case of cut-and-fill, or channel type deposits.

Area A, FIGS. 2-11, was used to show and the technique, method and mechanics in detail.

Area B, FIGS. 12-17, was used to show one of the other types of stratigraphic conditions, cut-and-fill or channel fill. Area B sand reservoirs are preserved and accumulated in depositional lows; therefore, favorable reservoir developments are located on the flanks of the depositional structure. In FIG. 14, the apparent dips are drawn with the reservoir development and production below the line. The prospect summary map for the B area shows several different oil-water contacts within the different initial accumulation areas which are separated by permeability barriers and sand limits. Several development locations are indicated along with an indicated prospect area on the east.

There are many mechanical techniques for obtaining residual structure, trend surfaces, average structure, isopach maps and regional average structure. None of these techniques have any direct relationship to actual subsurface conditions. All of these techniques are trying to approximate depositional structure, but none interrelate the actual stratigraphic reservoir development from available wells, establish an independent related adjustment factor for each horizon to be evaluated, can calculate an actual relative value for each well or prospect, or show accumulation areas, maximum potential reservoir fill, migration paths, permeability barriers, secondary adjustment, predict reservoir performance, pressure cells, and be able to confirm or project these conditions with structural control.

There are three key unique, different, and essential conceptual steps which, when combined, result in the invention of the depositional reconstruction for petroleum location:

1. First, the concept must be accepted that the sea floor at the time of sediment deposition was not flat, but an uneven warped surface with sea level wave related energies and effects similar to those that exist today. Wave-related energies are higher in shallow areas and lower in deeper areas. Sediment deposition, whether clastics or carbonates, are directly affected by depth and relative wave energy.

2. The intersecting straight line structural profiles are essential and must be selectively located through control wells, so that there is, as near as possible, both up dip and down dip control. The establishment of the apparent dip of the depositional plane is the key to depositional reconstruction. Once the apparent dip has been established on two intersecting structural profiles, a true dip and strike for the adjustment plane can be calculated and a direct relationship between present day structure and reservoir development has been established for mapping, projecting and evaluation.

3. The depositional reconstruction results in a map which shows the structure of the sea floor at the time of deposition and for the first time primary reservoir quality can be mapped, permeability barriers determined, accumulation areas determined, migration paths mapped, pressure cells outlined, fluid flow predictions and secondary adjustments predicted. Since a direct relationship between reservoir development and present day structure has been established, it is now possible for the first time to confirm or project desirable reservoir development with limited seismic structure. A summary map shows the outline of existing production with extensions for development, structural prospects with favorable reservoir development and relative evaluation of combination structural-stratigraphic type traps.

Depositional reconstruction for petroleum location is a quick and economical exploration-development technique which utilizes available information for a new evaluation of many previously unmapable factors which control reservoir evaluation and performance for a profitable exploration-development program.

Depositional reconstruction establishes a unique new process for establishing a previously nonexistent relationship between present day subsurface structure of a potential geological horizon and the effective reservoir development in the horizon.

When this unique relationship has been determined, effective reservoir development can be projected by subsurface structure (which can geologically be easily determined and if desired, the structural element can be geophysically confirmed without drilling a test well).

Once the relationship has been determined and the depositional structure map has been made, many determinations and observations can be mapped for the first time:

1. maximum initial accumulation areas can be outlined;

2. relative reservoir quality can be determined;

3. hydrocarbon migration paths can be mapped;

4. permeability decreases and barriers can be mapped;

5. primary combination structural-stratigraphic type traps can be outlined;

6. secondary adjustment areas can be determined;

7. primary prospect areas can be outlined and graded; and 8. any additional potential horizon in the area can be summarily studied and the prospects summarized for multiple pay potential.

Depositional reconstruction and the resulting reservoir evaluation is a unique new exploration-development tool for:

1. locating new prospects for hydrocarbon discovery;

2. determining field development locations and defining field limits without drilling dry holes;

3. evaluating and predicting reservoir performance during primary production and secondary recovery projects;

4. substantually high grading exploration-development programs quickly for increases success, economic evaluation and desirable oil and gas lease activity.

The foregoing description has illustrated the present invention in one form. It will be appreciated that the present invention can be performed by computer programmed to practice the process.

It will be apparent to those skilled in the art that various changes may be made in the invention without departing from the spirit and scope thereof and therefore the invention is not limited by that which is enclosed in the drawings and specifications, but only as indicated in the appended claim.

I claim:

1. A method of utilizing subsurface geological formation data for use in prospecting for subsurface hydrocarbon reservoir locations within a survey area where the survey area includes dry wells and hydrocarbon productive wells which penetrate earth formations, said method including the steps of:

obtaining geological formation data descriptive of the physical characteristics of said earth formations from wells within the survey area for identifying a subsurface stratum containing hydrocarbon reservoir locations;

deriving a structural contour map of said subsurface stratum within said survey area from said geological formation data where the dry wells and the hydrocarbon productive wells are located relative to said contour map;

defining at least two straight control datum lines with respect to said structural contour map where said control datum lines intersect at an intersection point, said intersection point being located on said structural contour map where said intersection point is at a first known depth on the contour map and is an area of known porosity and hydrocarbon production characteristics relative to said dry wells and said productive wells and where said control datum lines respectively extend from said intersection point to different discrete locations on said contour map where said stratum has different vertical depths than said intersection point relative to sea level and where the earth formations at said different discrete locations have known porosity and hydrocarbon production characteristics;

plotting geological structural profiles of said subsurface stratum in vertical planes respectively extending through each of said control lines;

for each geological structural profile, constructing an apparent dip line for each geological structural profile of said subsurface stratum where the apparent dip line is at an angle which corresponds to the inclination in a vertical plane of the substratum structural profile between said intersection point and one of said different discrete locations and where the apparent dip line separates in said vertical profile the generally hydrocarbon productive reservoir areas of the earth formation subsurface stratum from reservoir areas of the earth formation subsurface stratum which are generally not hydrocarbon productive;

with respect to a first depositional plane defined by said apparent dip lines, determining dip and azimuth of said first depositional plane, utilizing said dip and azimuth determinations for adjusting depth data representing the depths of datum points on said structural contour map to obtain adjusted depth data where said adjusted depth data represent the depths of reconstructed datum points which define a reconstructed depositional structure contour map of said subsurface stratum for determining subsurface hydrocarbon reservoir locations.

2. The method as set forth in claim 1 which further includes the steps of locating contours on said reconstructed depositional structure contour map where some of said contours enclose depositional structural high locations and define the boundaries for depositional structural enclosures suitable for hydrocarbon accumulations, and grading the enclosed areas of said closed depositional structure contours with respect to reservoir quality as defined by porosity and permeability characteristics of the subsurface stratum where said characteristics are obtained from geological formation data of said substratum with said survey area.

3. The method as set forth in claim 2 which includes the step of locating on the reconstructed depositional structure contour map, the migration paths for movement of hydrocarbons from depositional structural high locations to higher depositional structural locations wherein said migration paths are defined by the axes of the depositional structural high points between the depositional structural enclosures.

4. The method as set forth in claim 2 which includes the step of defining the permeability barriers between said depositional structural enclosures as represented by the axes of the depositional structural lows which correspond to the areas of said substratum having poor porosity and permeability characteristics.

5. A method of utilizing subsurface geological formation data for use in prospecting for subsurface hydrocarbon reservoir locations within a survey area where the survey area includes dry well and hydrocarbon productive wells which penetrate earth formations, said method including the steps of:

obtaining geological formation data from wells within the survey area and for identifying a subsurface stratum containing hydrocarbon reservoir locations where said stratum is defined by first map structure contour representations;

defining a first plane from dip and azimuth with respect to the subsurface stratum within the survey area where at least two discrete structural profiles of the subsurface stratum intersect within said survey area and where said structural profiles each can be provided with an apparent dip line on said first plane which separates, on each structural profile, first generally hydrocarbon productive reservoir areas of the earth formations from second reservoir areas of the earth formation which are generally not hydrocarbon productive as indicated by said geological formation data;

from said first plane, obtaining depth data indicating depths of vertically located points on said first plane relative to said map structure contour representations, and vertically adjusting said first map structure contour representations by use of said depth data for defining reconstructed second depositional contour representations of said substrate stratum where hydrocarbon reservoir locations may be determined therefrom.

* * * * *